United States Patent
Fukubayashi

(10) Patent No.: US 10,033,215 B2
(45) Date of Patent: Jul. 24, 2018

(54) STORAGE BATTERY SYSTEM, METHOD OF UPDATING STORAGE BATTERY SYSTEM, AND STORAGE MEDIUM

(71) Applicant: NEC Corporation, Tokyo (JP)

(72) Inventor: Yuichiro Fukubayashi, Tokyo (JP)

(73) Assignee: NEC Corporation, Tokyo (JP)

(*) Notice: Subject to any disclaimer, the term of this patent is extended or adjusted under 35 U.S.C. 154(b) by 127 days.

(21) Appl. No.: 14/917,443

(22) PCT Filed: Jul. 7, 2014

(86) PCT No.: PCT/JP2014/068077
§ 371 (c)(1),
(2) Date: Mar. 8, 2016

(87) PCT Pub. No.: WO2015/033660
PCT Pub. Date: Mar. 12, 2015

(65) Prior Publication Data
US 2016/0226262 A1      Aug. 4, 2016

(30) Foreign Application Priority Data

Sep. 9, 2013 (JP) ................................. 2013-186509

(51) Int. Cl.
*H02J 7/00* (2006.01)
*G06F 11/00* (2006.01)
(Continued)

(52) U.S. Cl.
CPC .............. *H02J 7/007* (2013.01); *G06F 11/00* (2013.01); *H01M 10/425* (2013.01);
(Continued)

(58) Field of Classification Search
CPC ....... H02J 7/007; G06F 11/00; H01M 10/425; H01M 10/44; H01M 10/48
(Continued)

(56) References Cited

U.S. PATENT DOCUMENTS 9,664,745 B1 * 5/2017 Fearn ................. G01R 31/3648
2003/0076072 A1 * 4/2003 Tojo .................... G01R 31/3648
                                                              320/134
(Continued)

FOREIGN PATENT DOCUMENTS

EP   2 818 355 A1   12/2014
JP   2006-243929     9/2006
(Continued)

OTHER PUBLICATIONS

International Search Report and Written Opinion dated Sep. 16, 2014 in corresponding PCT International Application.
(Continued)

*Primary Examiner* — Stacy Whitmore
(74) *Attorney, Agent, or Firm* — Finnegan, Henderson, Farabow, Garrett & Dunner, L.L.P.

(57) ABSTRACT

Provided is a method of updating a control program for controlling a storage battery system, the method capable of suppressing inconveniences that may occur due to the forcible stop of charging or discharging being performed by the storage battery system. In order to solve the problem, there is provided a storage battery system (10) including a storage battery unit (11) that performs power charging and discharging, the storage battery system (10) determining whether the storage battery unit (11) is in a discharging state and determining a timing at which an update program for updating a control program for controlling the storage battery system (10) is executed, on the basis of the determination.

21 Claims, 20 Drawing Sheets

(51) Int. Cl.
  *H01M 10/48* (2006.01)
  *H01M 10/42* (2006.01)
  *H01M 10/44* (2006.01)

(52) U.S. Cl.
  CPC .......... *H01M 10/44* (2013.01); *H01M 10/48* (2013.01); *H01M 2010/4271* (2013.01); *H02J 2007/0096* (2013.01)

(58) Field of Classification Search
  USPC ........................................................ 320/134
  See application file for complete search history.

(56) References Cited

U.S. PATENT DOCUMENTS

| | | | |
|---|---|---|---|
| 2010/0213891 A1* | 8/2010 | Nishikawa | H01M 10/42 320/106 |
| 2011/0231834 A1 | 9/2011 | Kim | |
| 2011/0264381 A1* | 10/2011 | Gering | H01M 10/48 702/32 |
| 2012/0059527 A1* | 3/2012 | Beaston | H01M 10/441 700/295 |
| 2012/0297211 A1 | 11/2012 | Lee | |
| 2013/0164567 A1 | 6/2013 | Olsson et al. | |
| 2014/0015469 A1* | 1/2014 | Beaston | H02J 3/32 320/101 |
| 2015/0032315 A1 | 1/2015 | Kinomura et al. | |
| 2015/0295430 A1* | 10/2015 | Wright | H02J 7/0003 320/162 |

FOREIGN PATENT DOCUMENTS

| | | |
|---|---|---|
| JP | 2009-211269 | 9/2009 |
| JP | 2010-191880 | 9/2010 |
| JP | 2011-894 | 1/2011 |
| JP | 2013-50862 | 3/2013 |
| WO | WO 2012/027736 A2 | 3/2012 |
| WO | WO 2013/124978 A1 | 8/2013 |

OTHER PUBLICATIONS

Singaporean Office Action issued by the Intellectual Property Office of Singapore in counterpart Singaporean Patent Application No. 11201601815V, dated Apr. 18, 2017.
Reconsideration Report dated Mar. 14, 2017 by the Japanese Patent Office in counterpart Japanese Patent Application No. 2015-535358.
Extended European Search Report issued by the European Patent Office in counterpart European Patent Application No. 14841882.5, dated Apr. 21, 2017.

* cited by examiner

A : CHARGING

B : DISCHARGING

C : STANDBY

STORAGE BATTERY SYSTEM, METHOD OF UPDATING STORAGE BATTERY SYSTEM, AND STORAGE MEDIUM

CROSS-REFERENCE TO RELATED PATENT APPLICATIONS

This application is a National Stage Entry of International Application No. PCT/JP2014/068077, filed Jul. 7, 2014, which claims priority from Japanese Patent Application No. 2013-186509, filed Sep. 9, 2013. The entire contents of the above-referenced applications are expressly incorporated herein by reference.

TECHNICAL FIELD

The present invention relates to a storage battery system, a method of updating a storage battery system, and a program.

BACKGROUND ART

Patent Document 1 discloses a method of updating of a battery pack that updates firmware stored in a memory of a built-in control circuit in a rewritable manner, by an updating signal transmitted from a main body device that supplies power from a power source. In the updating method, when the memory of the battery pack is updated, an AC adapter is connected to the main body device, a charging and discharging stop signal for stopping discharging from a secondary battery of the battery pack to the main body device and charging of the secondary battery is transmitted to the control circuit of the battery pack through a communication line from the main body device in a state where power from a power source is supplied from the AC adapter to the main body device, and updating information is transmitted to the control circuit of the battery pack from the main body device in a state where the discharging to the main body device of the secondary battery and the charging from the main body device are stopped using the charging and discharging stop signal, thereby updating the memory.

RELATED DOCUMENT

Patent Document

[Patent Document 1] Japanese Unexamined Patent Application Publication No. 2010-191880

SUMMARY OF THE INVENTION

Technical Problem

When charging or discharging being performed by a storage battery system is forcibly stopped in order to update a control program of the storage battery system, various inconveniences may occur due to the stop. For example, inconveniences such as the stopping of an operation of an electronic device having been supplied with power from the storage battery system or the missing of a timing for performing the charging of power which is self-generated through a unit, such as a solar cell, having power generation conditions depending on an environment such as the weather may occur. Meanwhile, the illustration as used herein is just an example. When charging or discharging being performed by the storage battery system is forcibly stopped, various other inconveniences may occur.

An object of the present invention is to provide an updating method capable of suppressing inconveniences that may occur due to the forcible stop of charging or discharging being performed by a storage battery system.

Solution to Problem

According to the present invention, there is provided a storage battery system including a storage battery that performs power charging and discharging, wherein the storage battery determines whether the storage battery is in a discharging state, and determines a timing at which an update program for updating a control program for controlling the storage battery system is executed on the basis of the determination.

In addition, according to the present invention, there is provided a method of updating a storage battery system including a storage battery that performs power charging and discharging, the method including causing a computer to determine whether the storage battery is in a discharging state and to determine a timing at which an update program for updating a control program for controlling the storage battery system is executed, on the basis of the determination.

In addition, according to the present invention, there is provided a program for a storage battery system including a storage battery that performs power charging and discharging, the program causing a computer to function as a unit that determines whether the storage battery is in a discharging state and determines a timing at which an update program for updating a control program for controlling the storage battery system is executed, on the basis of the determination.

Advantageous Effects of Invention

According to the present invention, it is possible to realize an updating method capable of suppressing inconveniences that may occur due to the forcible stop of charging or discharging being performed by a storage battery system.

BRIEF DESCRIPTION OF THE DRAWINGS

The above-described objects, other objects, features and advantages will be further apparent from the preferred exemplary embodiments described below, and the accompanying drawings as follows.

DESCRIPTION OF EXEMPLARY EMBODIMENTS

Figure 1:
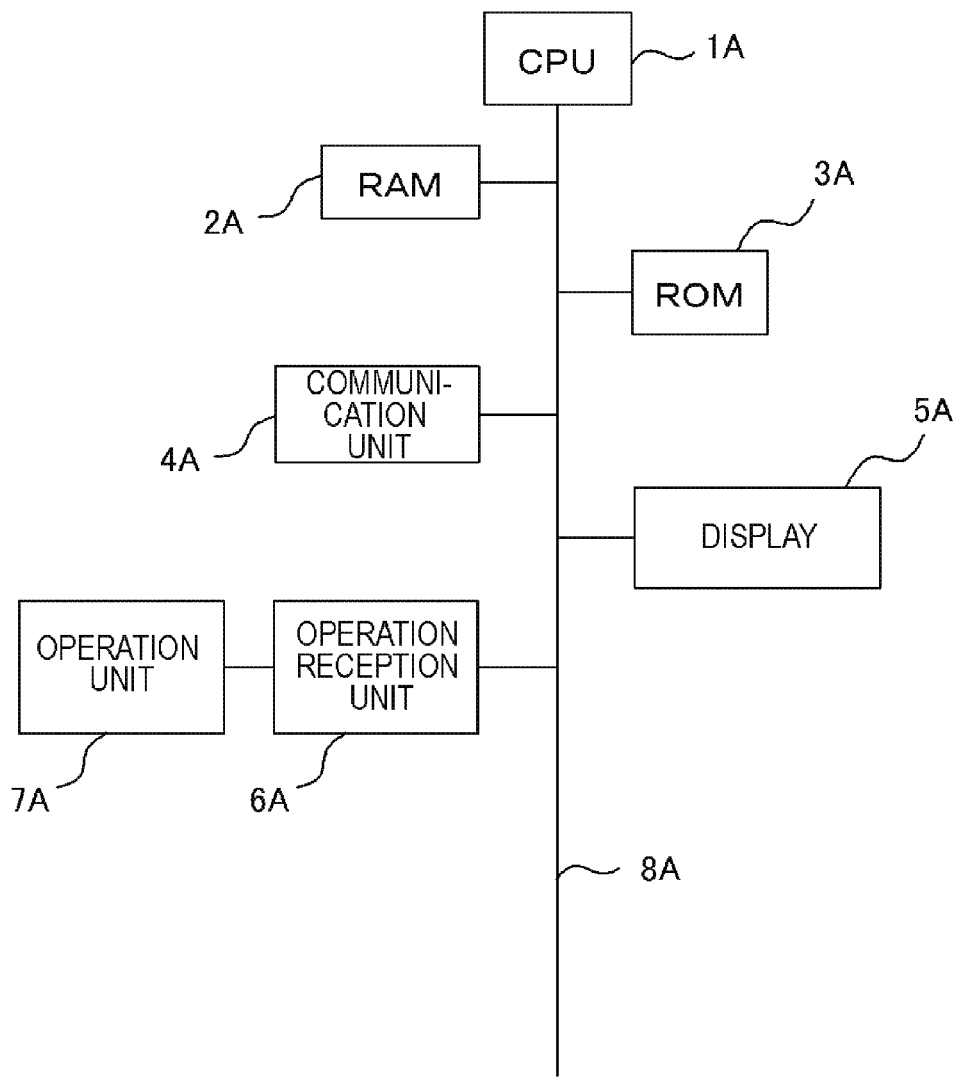
FIG. 1 is a schematic diagram illustrating an example of a hardware configuration of a storage battery system according to the present exemplary embodiment.

Hereinafter, exemplary embodiments of the present invention will be described with reference to the accompanying drawings. Meanwhile, the same components are denoted by the same reference numerals, and a description thereof will not be repeated.

First, a hardware configuration of a storage battery system according to the present exemplary embodiment and a plurality of modules included in the storage battery system will be described. These are common concepts in storage battery systems according to all of the following exemplary embodiments.

[Hardware Configuration]

A storage battery system according to the present exemplary embodiment is implemented by any combination of hardware and software based on a Central Processing Unit (CPU), a memory, a program (including a program stored in advance in the memory from the stage of shipping of an apparatus, and a program downloaded from a storage medium such as a Compact Disc (CD), a server on the Internet, or the like) which is loaded on the memory, a storage unit such as a hard disk storing the program, and an interface for network connection, which are of any computer. In addition, modifications can be made to the implementation method thereof and the apparatus.

FIG. 1 is a schematic diagram illustrating an example of a hardware configuration of the storage battery system according to the present exemplary embodiment. As illustrated in the drawing, the storage battery system according to the present exemplary embodiment includes, for example, a CPU 1A, a Random Access Memory (RAM) 2A, a Read Only Memory (ROM) 3A, a communication unit 4A, a display 5A, an operation reception unit 6A, an operation unit 7A, and the like which are connected to each other through a bus 8A. Meanwhile, although not shown in the drawing, the storage battery system may include other components such as a microphone, a speaker, and an auxiliary storage.

The CPU 1A controls the overall computer of the storage battery system together with the components. The ROM 3A includes an area in which programs for operating the computer and various application programs, various pieces of setting data used when the programs operate, and the like are stored. The RAM 2A includes an area, such as a work area for operating programs, in which data is temporarily stored.

The operation unit 7A includes operation keys, operation buttons, switches, a jog dial, a touch pad, a touch panel integrated with a display, and the like. The operation reception unit 6A receives a user's input performed by a user operating the operation unit 7A.

The communication unit 4A can be connected to a network such as the Internet or a Local Area Network (LAN). In addition, the communication unit 4A can communicate with an external device by one-to-one connection. The communication unit 4A can be connected to an external device or a network in a wired manner and/or using any wireless communication technique (short range radio communication, wireless LAN communication, or the like).

The display 5A includes a Light Emitting Diode (LED) display, a liquid crystal display, an organic electro luminescence (EL) display, and the like.

[Plurality of Modules]

Figure 2:
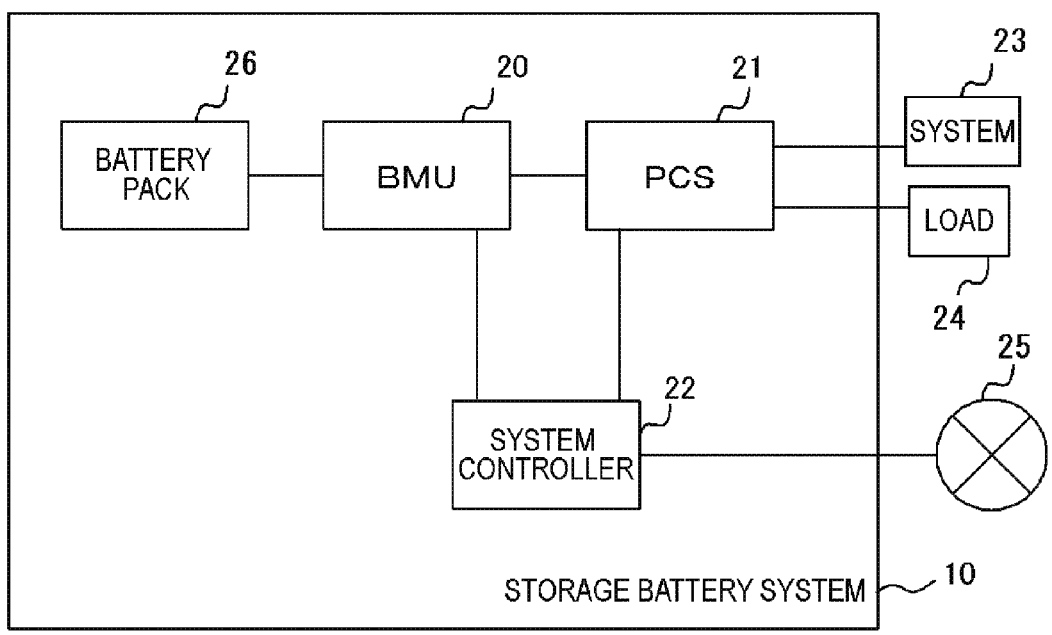
FIG. 2 is a diagram illustrating an example of a functional block diagram of a storage battery system according to the present exemplary embodiment.

Next, FIG. 2 illustrates an example of a functional block diagram of a storage battery system 10 according to the present exemplary embodiment which is realized by a plurality of modules. As illustrated in the drawing, the storage battery system 10 includes one or a plurality of battery packs 26, a Battery Management Unit (BMU) 20, a Power Conditioning System (PCS) 21, and a system controller 22.

The battery pack 26 includes a plurality of battery cells which are connected to each other in series and/or in parallel, and is configured to store power. The battery pack 26 is a secondary battery and is, for example, a lithium ion secondary battery, a lead storage battery, or the like.

The BMU 20 protects and controls the battery pack 26. The PCS 21 is located between the BMU 20, a system (electric power system) 23, and a load 24, performs DC/AC conversion of power, and adjusts a voltage and a frequency. Meanwhile, although not shown in the drawing, the PCS 21 may be connected to a power generating device such as a solar cell. The system controller 22 unitarily manages the BMU 20 and the PCS 21. The system controller 22 is connected to a network 25 such as the Internet or a LAN, and can transmit and receive data to and from a management center that manages the storage battery system 10.

Meanwhile, in FIG. 2, the battery pack 26, the BMU 20, the PCS 21 and the system controller 22 are separately described, but this indicates that these four modules are configured so as to be logically separated from each other. These modules may be configured so as to be physically separated from each other, or at least some of them may be integrally formed by any combination. For example, the battery pack 26 and the BMU 20 may be installed in a single housing.

First Exemplary Embodiment

The storage battery system according to the present exemplary embodiment determines whether a storage battery is in a discharging state, and determines a timing at which an update program for updating a control program for controlling the storage battery system is executed, on the basis of the determination. Hereinafter, a detailed description thereof will be given.

Figure 3:
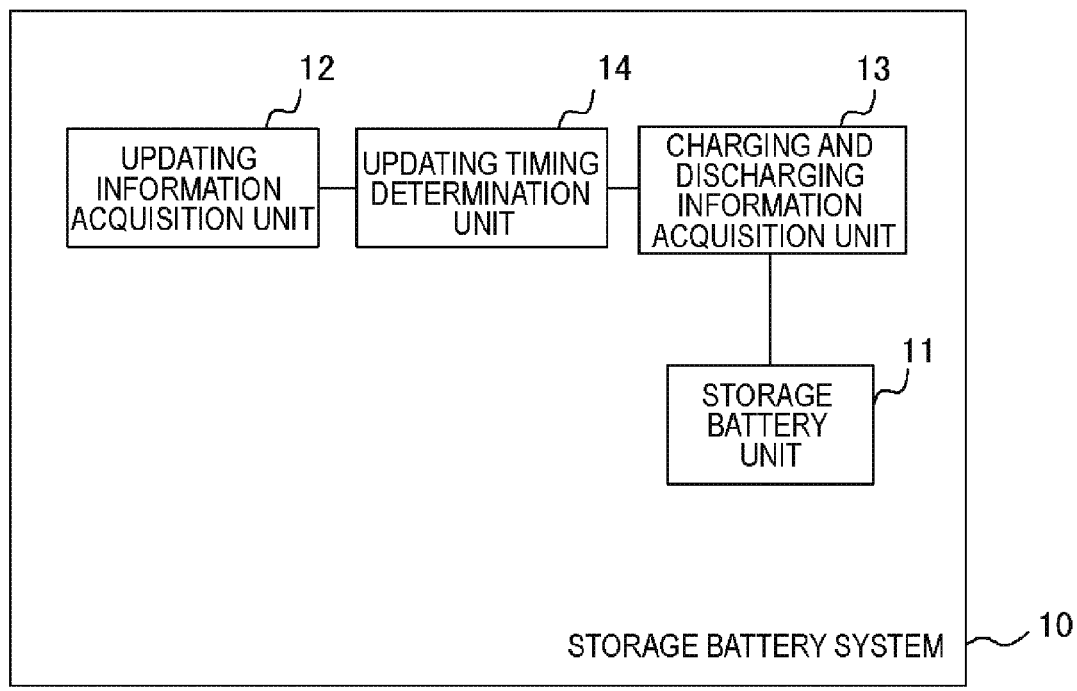
FIG. 3 is a diagram illustrating an example of a functional block diagram of a storage battery system according to the present exemplary embodiment.

FIG. 3 illustrates an example of a functional block diagram of the storage battery system 10 according to the present exemplary embodiment. As illustrated in the drawing, the storage battery system 10 includes a storage battery unit 11, an updating information acquisition unit 12, a charging and discharging information acquisition unit 13, and an updating timing determination unit 14.

The storage battery unit 11 performs power charging and discharging. The storage battery unit 11 is constituted by, for example, the battery pack 26, the BMU 20, and the PCS 21 which are illustrated in FIG. 2.

Figure 4:
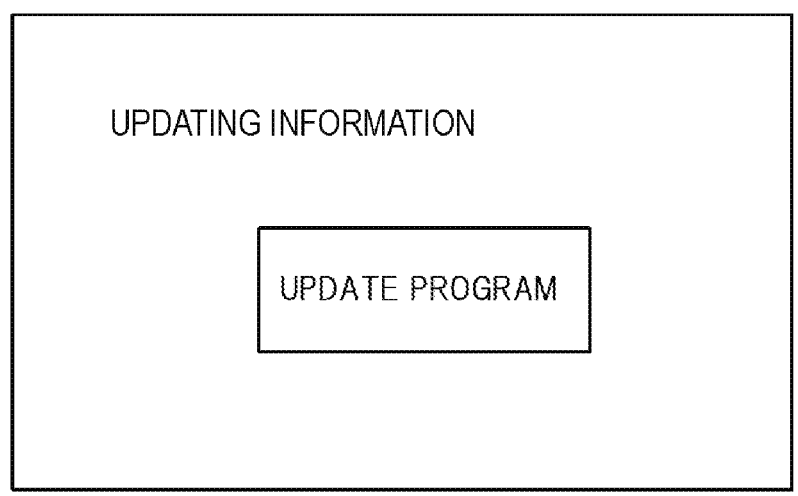
FIG. 4 is a schematic diagram illustrating an example of updating information according to the present exemplary embodiment.

The updating information acquisition unit 12 acquires updating information (see FIG. 4). The updating information includes an update program for updating a control program for controlling the storage battery system 10. The control program is a program for controlling the operation of the storage battery system 10, and each of the modules of the storage battery system 10 is operated by executing the control program. The concept of the control program includes basic software (operating system: OS), middle software, application software, and the like. The control program may include a control program for controlling the overall storage battery system 10, and a control program for each of the plurality of modules.

The update program may be a program for updating at least some of control programs installed in the storage battery system 10, may be a program for providing a new function to the storage battery system 10, or may be a program for deleting (uninstalling) at least some of the control programs installed in the storage battery system 10.

A unit of making the updating information acquisition unit 12 acquire updating information is not particularly limited. For example, the updating information acquisition unit 12 may acquire updating information from a management center that manages the storage battery system 10 through the network 25 such as the Internet. The management center may collectively manage the plurality of storage battery systems 10 that are installed in each household, each company, each building, and the like. As another example, the updating information acquisition unit 12 may acquire updating information from an external device (for example, a personal computer or the like) which is connected to the storage battery system 10 on a one-to-one basis in a wired manner and/or in a wireless manner.

The charging and discharging information acquisition unit 13 acquires charging and discharging information for determining which mode of charging, discharging, and standby the storage battery unit 11 is in. The wording "standby mode" as used herein refers to a state where the storage battery unit 11 is not performing charging and discharging (except for self-discharging).

The charging and discharging information acquisition unit 13 may acquire information indicating the current state (any of a charging mode, a discharging mode, and a standby mode) as the charging and discharging information from, for example, the storage battery unit 11.

Figure 5:
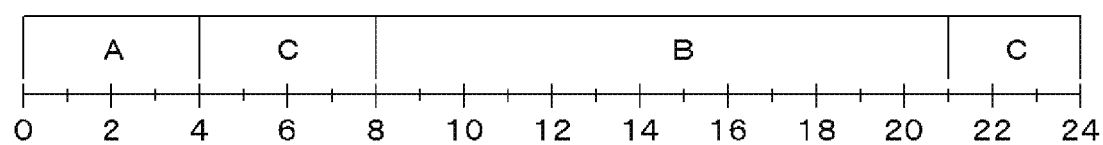
FIG. 5 is a schematic diagram illustrating an example of a charging and discharging schedule according to the present exemplary embodiment.

Alternatively, the charging and discharging information acquisition unit 13 may acquire, for example, a charging and discharging schedule of the storage battery unit 11 as the charging and discharging information. FIG. 5 schematically illustrates an example of a charging and discharging schedule. In the charging and discharging schedule illustrated in FIG. 5, schedules of charge, discharge, and standby are shown on a time axis from 0 o'clock to 24 o'clock. In the charging and discharging schedule, a charging time period, a discharging time period, and a standby time period are determined. Such a charging and discharging schedule may be generated in a management center. For example, the storage battery system 10 may acquire a charging and discharging schedule from a management center through the network 25. The storage battery system 10 may perform charging and discharging in accordance with the acquired charging and discharging schedule. For example, the charging and discharging schedule may be a schedule capable of cutting a peak of the amount of power supplied from a power supply company, or may be a schedule capable of realizing other effects. In addition, the charging and discharging schedule may be a schedule indicating charging, a schedule indicating discharging, or a schedule indicating both charging and discharging.

Meanwhile, the charging and discharging information acquisition unit 13 may acquire a charging and discharging prediction schedule which is determined on the basis of the past history of charging and discharging of the storage battery unit 11, as a charging and discharging schedule. For example, the charging and discharging prediction schedule may be a charging and discharging history itself on a certain day in the past (for example, the day before), or may be a prediction calculated according to a predetermined algorithm on the basis of histories of a plurality of days. The charging and discharging prediction schedule may be generated in a management center. For example, the storage battery system 10 may acquire the prediction of a charging and discharging schedule from a management center through the network 25. Meanwhile, the storage battery system 10 may not perform charging and discharging according to the charging and discharging prediction schedule.

When the updating information acquisition unit 12 acquires updating information, the updating timing determination unit 14 determines a timing at which an update program is executed, using charging and discharging information for determining the state (any of a charging mode, a discharging mode, and a standby mode) of the storage battery unit 11. When the updating timing determination unit 14 determines to execute an update program, the storage battery system 10 executes the update program using the determination as a trigger.

For example, the updating timing determination unit 14 determines the current state (any of a charging mode, a discharging mode, and a standby mode) of the storage battery unit 11 using charging and discharging information. While the storage battery unit 11 is in any of a charging mode and a discharging mode, the updating timing determination unit 14 does not determine to execute an update program. The updating timing determination unit 14 determines to execute an update program when the storage battery unit 11 is in a standby mode.

As another example, the updating timing determination unit 14 determines the current state (any of a charging mode, a discharging mode, and a standby mode) of the storage battery unit 11 using charging and discharging information. While the storage battery unit 11 is in a charging mode, the updating timing determination unit 14 does not determine to execute an update program. The updating timing determination unit 14 determines to execute an update program when the storage battery unit 11 is in a discharging mode and a standby mode.

As another example, the updating timing determination unit 14 determines the current state (any of a charging mode, a discharging mode, and a standby mode) of the storage battery unit 11 using charging and discharging information. While the storage battery unit 11 is in a discharging mode, the updating timing determination unit 14 does not determine to execute an update program. The updating timing determination unit 14 determines to execute an update program when the storage battery unit 11 is in a charging mode or a standby mode.

According to the above-mentioned storage battery system 10 according to the present exemplary embodiment, it is possible to determine whether a storage battery is in a discharging state and to determine a timing at which an update program for updating a control program for controlling the storage battery system 10 is executed, on the basis of the determination. For example, the determination can be performed so that an update program is not executed in a case of a discharging state and is executed in a case of not being a discharging state. In this manner, it is possible to avoid a situation in which the discharging of the storage battery system 10 is forcibly stopped in order to execute the update program. As a result, it is possible to avoid, for example, an inconvenience in that the operation of an electric device being operated using power from the storage battery system 10 is unintentionally stopped.

In addition, according to the above-mentioned storage battery system 10 according to the present exemplary embodiment, it is possible to determine a timing at which an update program is executed using charging and discharging information for determining the state (any of a charging mode, a discharging mode, and a standby mode) of the storage battery unit 11, thereby allowing the update program not to be executed when the storage battery unit 11 is in a charging mode and/or a discharging mode. For this reason, it is possible to avoid an inconvenience in that charging or discharging being performed by the storage battery unit 11 is forcibly stopped in order to execute the update program. As a result, it is possible to update a control program of the storage battery system 10 while suppressing inconveniences that may occur due to the forcible stop of charging or discharging being performed by the storage battery system.

Second Exemplary Embodiment

An example of a functional block diagram of a storage battery system 10 according to the present exemplary embodiment is illustrated in FIG. 3, similar to the first exemplary embodiment. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configurations of the storage battery unit 11 and the updating information acquisition unit 12 are the same as those in the first exemplary embodiment, and thus a description thereof will not be repeated herein.

The charging and discharging information acquisition unit 13 acquires information indicating the current state of the storage battery unit 11, as charging and discharging information. The charging and discharging information acquisition unit 13 can acquire the charging and discharging information from the storage battery unit 11.

The updating timing determination unit 14 determines to execute an update program when the state of the storage battery unit 11 which is determined on the basis of the charging and discharging information acquired by the charging and discharging information acquisition unit 13 is a standby mode.

Figure 6:
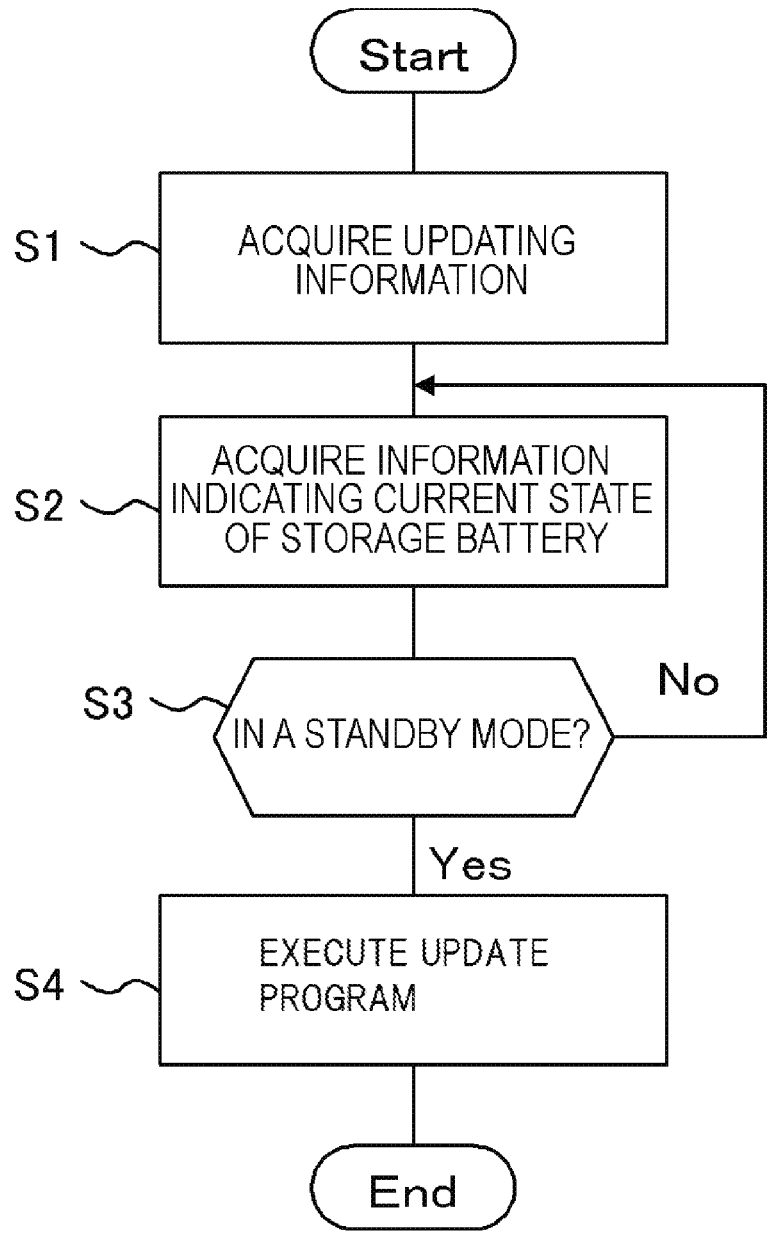
FIG. 6 is a flowchart illustrating an example of a flow of processing of a storage battery system according to the present exemplary embodiment.

Next, an example of a flow of processing of the storage battery system 10 according to the present exemplary embodiment will be described with reference to a flow chart of FIG. 6.

When the updating information acquisition unit 12 acquires updating information (S1), the updating timing determination unit 14 acquires information (charging and discharging information) indicating the current state (any of a charging mode, a discharging mode, and a standby mode) of the storage battery unit 11 through the charging and discharging information acquisition unit 13 at the subsequent predetermined timing (for example, using the acquisition of updating information by the updating information acquisition unit 12 as a trigger) (S2).

When the state determined on the basis of the charging and discharging information acquired in S2 is not a standby mode (No in S3), the updating timing determination unit 14 repeats the processes of S2 and S3 until the state determined on the basis of the charging and discharging information is set to be a standby mode. Meanwhile, the updating timing determination unit 14 may repeat a process including a set of the acquisition in S2 and the determination in S3 at predetermined time intervals, for example, every 5 minutes or every 30 minutes.

On the other hand, when the state determined on the basis of the charging and discharging information acquired in S2 is a standby mode (Yes in S3), the updating timing determination unit 14 determines to execute an update program included in the updating information acquired in S1 by the updating information acquisition unit 12. The storage battery system 10 executes the update program using the determination as a trigger (S4).

According to the above-mentioned storage battery system 10 of the present exemplary embodiment, it is possible to realize the same operation and effect as those in the first exemplary embodiment.

In addition, an update program can be executed when the storage battery unit 11 is in a standby mode and cannot be executed when the storage battery unit is in a charging or discharging mode, and thus it is possible to avoid an inconvenience in that charging or discharging being performed by the storage battery unit 11 is forcibly stopped in order to execute the update program. As a result, it is possible to update a control program of the storage battery system 10 while suppressing inconveniences that may occur due to the forcible stop of charging or discharging being performed by the storage battery system 10.

Third Exemplary Embodiment

An example of a functional block diagram of a storage battery system 10 according to the present exemplary embodiment is illustrated in FIG. 3, similar to the first and second exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configurations of the storage battery unit 11 and the updating information acquisition unit 12 are the same as those in the first and second exemplary embodiments, and thus a description thereof will not be repeated herein.

The charging and discharging information acquisition unit 13 acquires a charging and discharging schedule of the storage battery unit 11 as charging and discharging information. FIG. 5 schematically illustrates an example of a charging and discharging schedule. The charging and discharging schedule acquired by the charging and discharging information acquisition unit 13 according to the present exemplary embodiment is a schedule generated in a management center for the purpose of cutting a peak of the amount of power supplied from a power supply company. The storage battery system 10 performs charging and discharging from the storage battery unit 11 in accordance with the schedule. The definition of the charging and discharging schedule and a method of acquiring the charging and discharging schedule by the charging and discharging information acquisition unit 13 have been described in the first exemplary embodiment, and thus a description thereof will not be repeated herein.

The updating timing determination unit 14 determines to execute an update program during standby in the charging and discharging schedule acquired by the charging and discharging information acquisition unit 13.

Meanwhile, contents of the charging and discharging schedule acquired from the management center by the charging and discharging information acquisition unit 13 may be thereafter updated by updating information transmitted to the storage battery system 10 from the management center. In this case, the updating timing determination unit 14 ascertains a schedule of the storage battery unit 11 on the basis of the updated latest charging and discharging schedule and determines to execute an update program during standby in the schedule.

Figure 7:
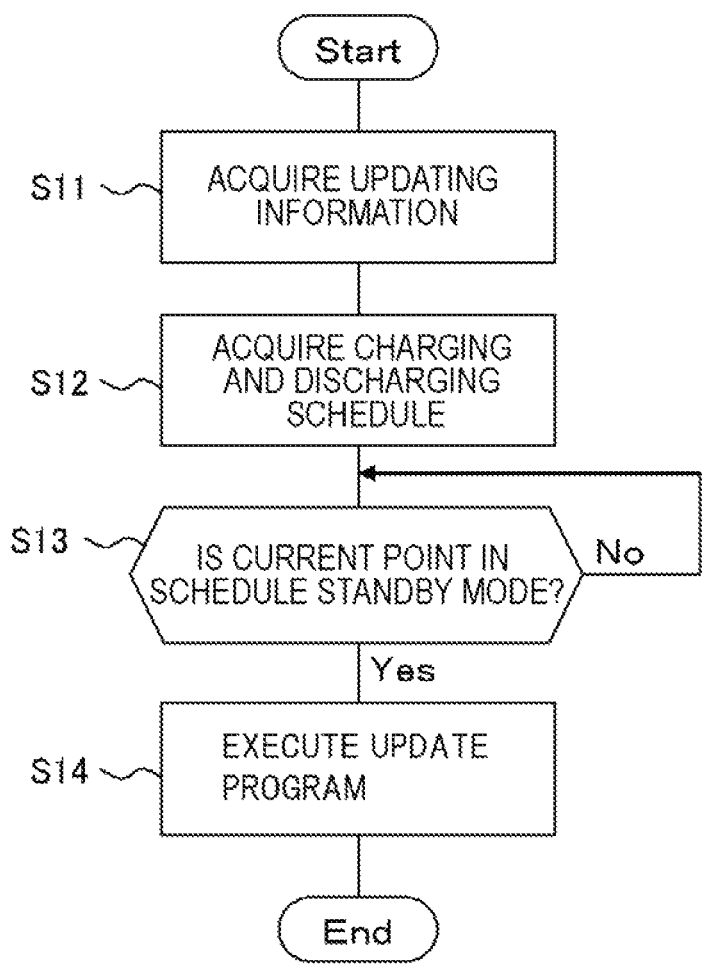
FIG. 7 is a flowchart illustrating an example of a flow of processing of a storage battery system according to the present exemplary embodiment.

Next, an example of a flow of processing of the storage battery system 10 according to the present exemplary embodiment will be described with reference to a flow chart of FIG. 7.

When the updating information acquisition unit 12 acquires updating information (S11), the updating timing determination unit 14 acquires a charging and discharging schedule (charging and discharging information) through the charging and discharging information acquisition unit 13 at the subsequent predetermined timing (for example, using the acquisition of updating information by the updating information acquisition unit 12 as a trigger) (S12). For example, the charging and discharging information acquisition unit 13 acquires a charging and discharging schedule for a certain day from a management center at a predetermined timing (for example, 23 o'clock the day before, or the like), and stores the acquired charging and discharging schedule in the storage battery system 10. In S12, the updating timing determination unit 14 acquires the charging and discharging schedule stored in the storage battery system 10, through the charging and discharging information acquisition unit 13.

When the current point in the charging and discharging schedule acquired in S12 is not a standby mode (No in S13), the updating timing determination unit 14 continues comparing the current time with the charging and discharging schedule until the current point in the schedule is set to be a standby mode.

On the other hand, when the current point in the charging and discharging schedule acquired in S12 is a standby mode (Yes in S13), the updating timing determination unit 14 determines to execute an update program included in the updating information acquired in S11 by the updating information acquisition unit 12. The storage battery system 10 executes the update program using the determination as a trigger (S14).

According to the above-mentioned storage battery system 10 of the present exemplary embodiment, it is possible to realize the same operation and effect as those in the first exemplary embodiment.

In addition, an update program can be executed when the storage battery unit 11 is in a standby mode and cannot be executed when the storage battery unit is in a charging or discharging mode, and thus it is possible to avoid an inconvenience in that charging or discharging being performed by the storage battery unit 11 is forcibly stopped in order to execute the update program. As a result, it is possible to update a control program of the storage battery system 10 while suppressing inconveniences that may occur due to the forcible stop of charging or discharging being performed by the storage battery system 10.

Fourth Exemplary Embodiment

An example of a functional block diagram of a storage battery system 10 according to the present exemplary embodiment is illustrated in FIG. 3, similar to the first to third exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configurations of the storage battery unit 11 and the updating information acquisition unit 12 are the same as those in the first to third exemplary embodiments, and thus a description thereof will not be repeated herein.

The charging and discharging information acquisition unit 13 acquires a charging and discharging prediction schedule which is determined on the basis of the past history of charging and discharging of the storage battery unit 11, as charging and discharging information. Similarly to the charging and discharging schedule acquired by the charging and discharging information acquisition unit 13 according to the third exemplary embodiment, the charging and discharging prediction schedule is shown in an aspect as illustrated in FIG. 5. The definition of the charging and discharging prediction schedule and a method of acquiring the charging and discharging prediction schedule by the charging and discharging information acquisition unit 13 have been described in the first exemplary embodiment, and thus a description thereof will not be repeated herein.

The updating timing determination unit 14 determines to execute an update program during standby in the charging and discharging prediction schedule acquired by the charging and discharging information acquisition unit 13.

Meanwhile, contents of the charging and discharging prediction schedule acquired from a management center by the charging and discharging information acquisition unit 13 may be thereafter updated by updating information transmitted to the storage battery system 10 from the management center. In this case, the updating timing determination unit 14 ascertains a prediction schedule of the storage battery unit on the basis of the updated latest charging and discharging prediction schedule and determines to execute an update program during standby in the schedule.

An example of a flow of processing of the storage battery system 10 according to the present exemplary embodiment is the same as that in the third exemplary embodiment.

According to the above-mentioned storage battery system 10 of the present exemplary embodiment, it is possible to realize the same operation and effect as those in the first exemplary embodiment.

In addition, an update program can be executed when the storage battery unit 11 is predicted to be in a standby mode and cannot be executed when the storage battery unit is predicted to be in a charging or discharging mode, and thus it is possible to reduce the occurrence of an inconvenience in that charging or discharging being performed by the storage battery unit 11 is forcibly stopped in order to execute the update program. As a result, it is possible to update a control program of the storage battery system 10 while suppressing inconveniences that may occur due to the forcible stop of charging or discharging being performed by the storage battery system 10.

Fifth Exemplary Embodiment

An example of a functional block diagram of a storage battery system 10 according to the present exemplary embodiment is illustrated in FIG. 3, similar to the first to fourth exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to fourth exemplary embodiments, and thus a description thereof will not be repeated herein.

Figure 8:
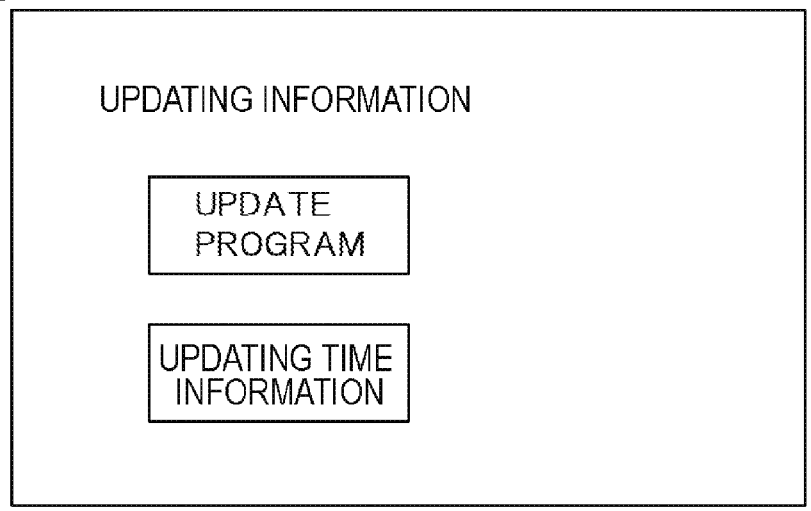
FIG. 8 is a schematic diagram illustrating an example of updating information according to the present exemplary embodiment.

The updating information acquisition unit 12 acquires updating information including updating time information roughly indicating an estimated time from the execution of an update program to the completion of an updating process (time from the start of the updating process to the end thereof). As illustrated in FIG. 8, the updating information acquired by the updating information acquisition unit 12 according to the present exemplary embodiment includes an update program and updating time information. The updating information may include information regarding an updating time, for example, the size of an update program.

The charging and discharging information acquisition unit 13 acquires a charging and discharging schedule of the storage battery unit 11 as charging and discharging information. The charging and discharging schedule may be a charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

The updating timing determination unit 14 determines a timing at which an update program is executed, in consideration of a period of time which is specified by updating time information. For example, the updating timing determination unit 14 may determine a timing at which an update program is executed so that an updating process can be completed during standby in the schedule, on the basis of the charging and discharging schedule and the updating time information.

Figure 9:
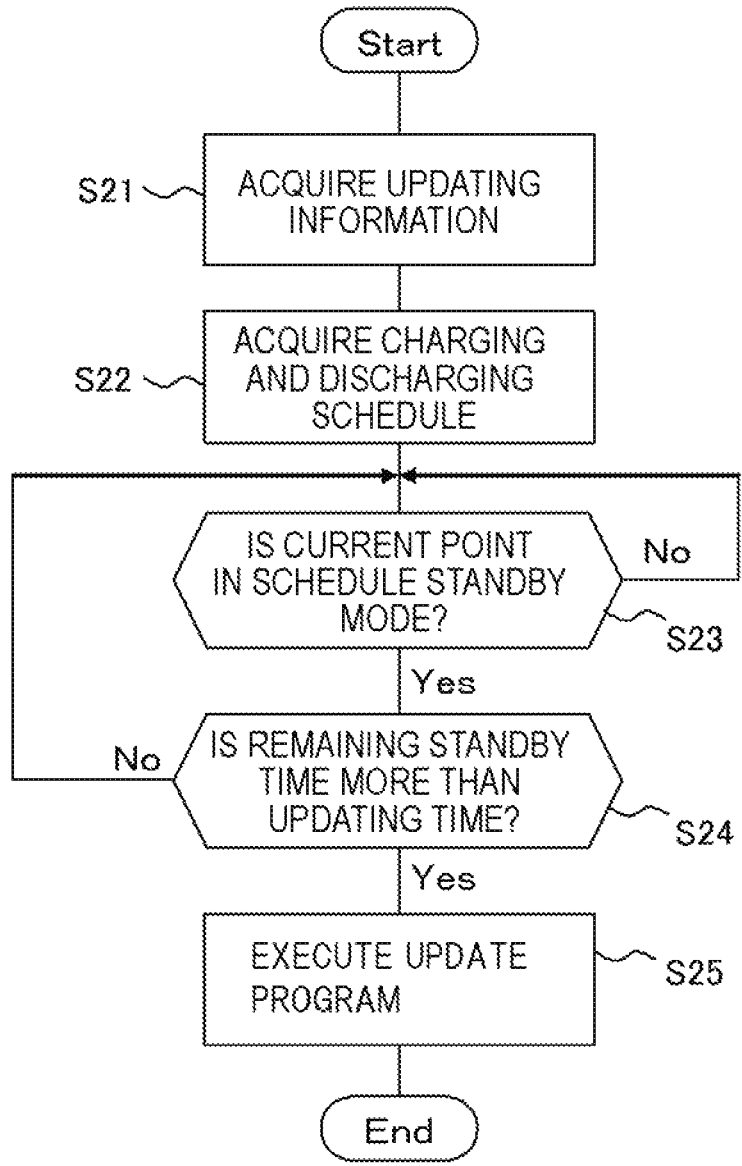
FIG. 9 is a flowchart illustrating an example of a flow of processing of a storage battery system according to the present exemplary embodiment.

Next, an example of a flow of processing of the storage battery system 10 according to the present exemplary embodiment will be described with reference to a flow chart of FIG. 9.

When the updating information acquisition unit 12 acquires updating information (S21), the updating timing determination unit 14 acquires a charging and discharging schedule (charging and discharging information) through the charging and discharging information acquisition unit 13 at the subsequent predetermined timing (for example, using the acquisition of updating information by the updating information acquisition unit 12 as a trigger) (S22). For example, the charging and discharging information acquisition unit 13 acquires a charging and discharging schedule for a certain day from a management center at a predetermined timing (for example, 23 o'clock the day before, or the like), and stores the acquired charging and discharging schedule in the storage battery system 10. In S22, the updating timing determination unit 14 acquires the charging and discharging schedule stored in the storage battery system 10, through the charging and discharging information acquisition unit 13.

When the current point in the charging and discharging schedule acquired in S22 is not a standby mode (No in S23), the updating timing determination unit 14 continues comparing the current time with the charging and discharging schedule until the current point in the schedule is set to be a standby mode.

On the other hand, when the current point in the charging and discharging schedule acquired in S22 is a standby mode (Yes in S23), the updating timing determination unit 14 ascertains a time for which the standby mode is continued after this, on the basis of the charging and discharging schedule. For example, when contents of the charging and discharging schedule acquired in S22 are shown in FIG. 5 and the current time is 6:00 o'clock, the updating timing determination unit 14 determines that the current point in the schedule is a standby mode and the state (standby) is continued for 2 hours after this (until 8 o'clock). Thereafter, the updating timing determination unit 14 determines whether the time for which the standby mode (remaining standby time) is continued is longer than the time which is specified by the updating time information included in the updating information acquired in S21 (S24).

When the time for which the standby mode is continued (remaining standby time) is more than the time which is specified by the updating time information (Yes in S24), the updating timing determination unit 14 determines to execute an update program included in the updating information acquired in S21 by the updating information acquisition unit 12. The storage battery system 10 executes the update program using the determination as a trigger (S24).

On the other hand, when the time for which the standby mode is continued (remaining standby time) is equal to or less than the time which is specified by the updating time information (No in S24), the updating timing determination unit 14 repeats the processes of S23 and S24.

According to the above-mentioned storage battery system 10 of the present exemplary embodiment, it is possible to realize the same operation and effect as those in the first exemplary embodiment.

In addition, according to the present exemplary embodiment, it is possible to complete the updating process during standby in the schedule. For this reason, it is possible to avoid an inconvenience in that when the storage battery system 10 attempts to start a charging and discharging process on the basis of a charging and discharging schedule, the charging and discharging process cannot be started due to an update program being executed. As a result, it is possible to update a control program of the storage battery system 10 without disturbing charging and discharging performed by the storage battery system 10.

Sixth Exemplary Embodiment

An example of a functional block diagram of a storage battery system 10 according to the present embodiment is illustrated in FIG. 3, similar to the first to fifth exemplary embodiments. As illustrated in the drawing, the storage battery system. 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to fifth exemplary embodiments, and thus a description thereof will not be repeated herein.

Figure 10:
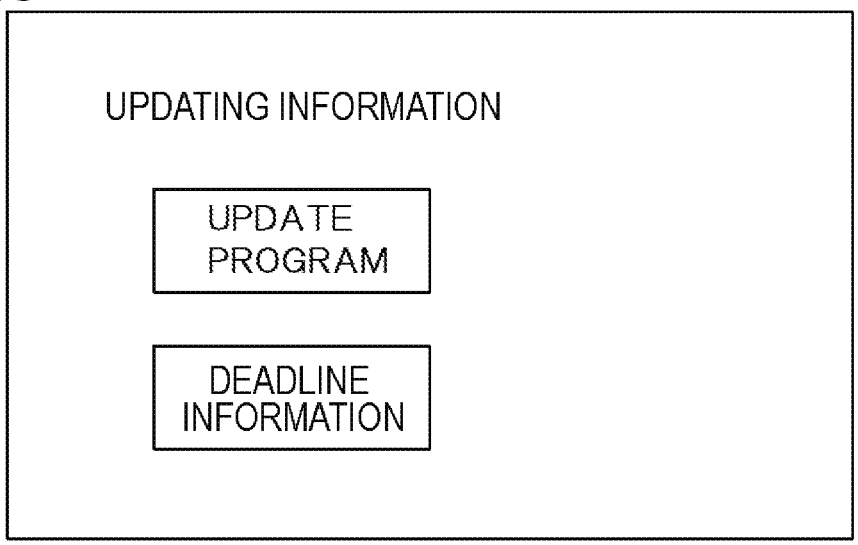
FIG. 10 is a schematic diagram illustrating an example of updating information according to the present exemplary embodiment.

The updating information acquisition unit 12 acquires updating information including deadline information indicating a deadline for completing an updating process. As illustrated in FIG. 10, the updating information acquired by the updating information acquisition unit 12 according to the present exemplary embodiment includes an update program and updating time information. Meanwhile, although not shown in the drawing, the updating information may further include the updating time information described in the fifth exemplary embodiment.

The charging and discharging information acquisition unit 13 acquires information indicating the current state of the storage battery unit 11, as charging and discharging information. The charging and discharging information acquisition unit 13 can acquire the charging and discharging information from the storage battery unit 11.

The updating timing determination unit 14 determines a timing at which an update program is executed, in consideration of a deadline which is specified by deadline information. For example, in a case where a remaining time before the deadline is equal to or more than a predetermined value, the updating timing determination unit 14 determines to execute the update program when the state of the storage battery unit 11 is a standby mode. On the other hand, in a case where the remaining time before the deadline is less than the predetermined value, the updating timing determination unit 14 can determine to execute the update program when the state of the storage battery unit 11 is a standby mode, a charging mode, or a discharging mode.

Figure 11:
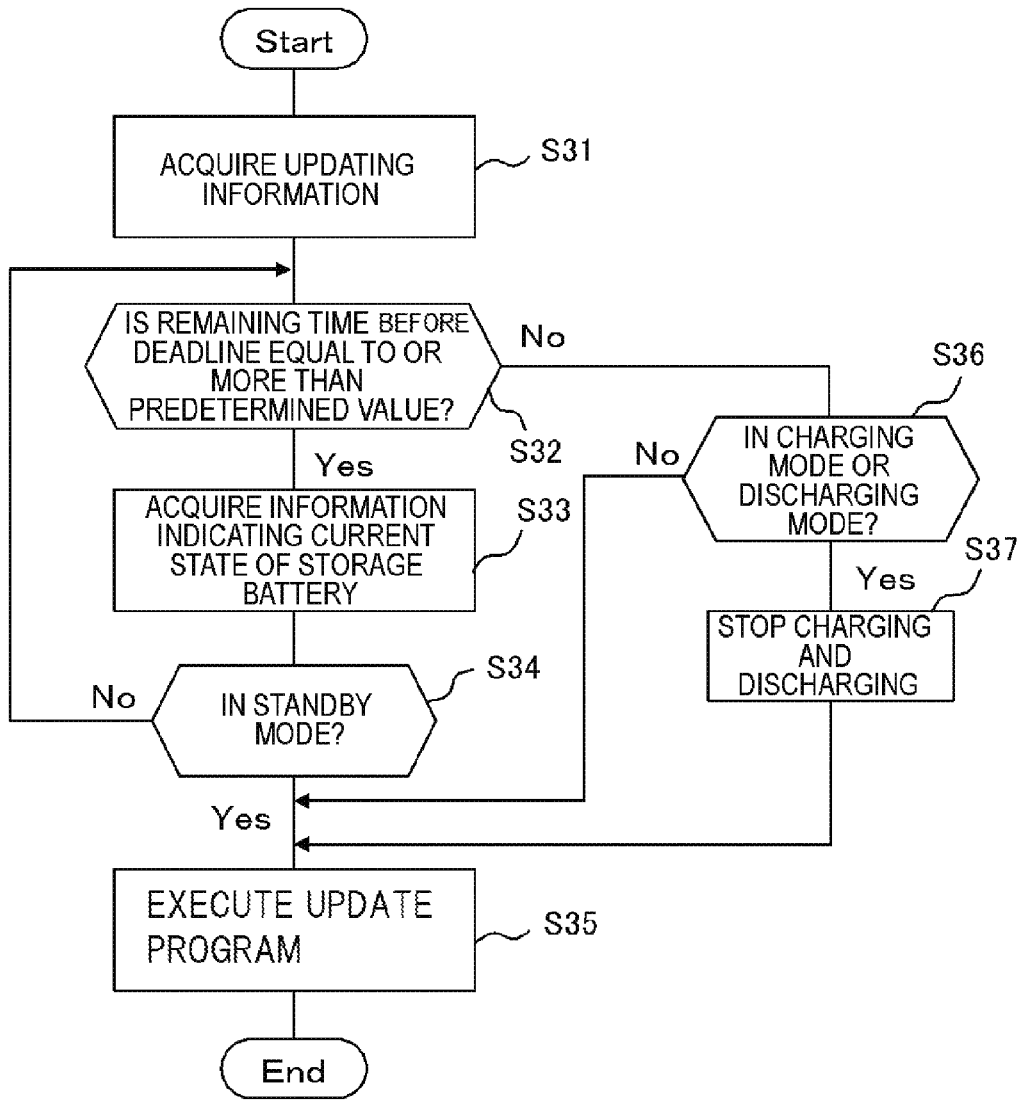
FIG. 11 is a flow chart illustrating an example of a flow of processing of a storage battery system according to the present exemplary embodiment.

Next, an example of a flow of processing of the storage battery system 10 according to the present exemplary embodiment will be described with reference to a flow chart of FIG. 11.

When the updating information acquisition unit 12 acquires updating information (S31), the updating timing determination unit 14 extracts deadline information included in updating information and calculates a remaining time before a deadline specified by the deadline information. When the remaining time before the deadline is equal to or more than a predetermined value (Yes in S32), the updating timing determination unit 14 acquires information (charging and discharging information) indicating the current state (any of a charging mode, a discharging mode, and a standby mode) of the storage battery unit 11 through the charging and discharging information acquisition unit 13 at the subsequent predetermined timing (S33).

When the state determined on the basis of the charging and discharging information acquired in S33 is not a standby mode (No in S34), the updating timing determination unit 14 repeats the processes of S32 to S34 until the result in S32 is set to be No or the result in S34 is set to be Yes. Meanwhile, the updating timing determination unit 14 may repeat a process of a set of the processes of S32 to S34 at predetermined time intervals, for example, every 5 minutes or every 30 minutes.

On the other hand, when the state determined on the basis of the charging and discharging information acquired in S33 is a standby mode (Yes in S34), the updating timing determination unit 14 determines to execute an update program included in the updating information acquired in S31 by the updating information acquisition unit 12. The storage battery system 10 executes the update program using the determination as a trigger (S35).

Meanwhile, as a result of the determination in S32, when the remaining time before the deadline is less than the predetermined value (No in S32), the flow proceeds to S36. In S36, the updating timing determination unit 14 acquires information (charging and discharging information) indicating the current state (any of a charging mode, a discharging mode, and a standby mode) of the storage battery unit 11 through the charging and discharging information acquisition unit 13. When the state determined on the basis of the acquired charging and discharging information is a charging mode or a discharging mode (Yes in S36), the updating timing determination unit stops charging and discharging performed by the storage battery unit 11 (S37) and then determines to execute the update program included in the updating information acquired in S31 by the updating information acquisition unit 12. The storage battery system 10 executes the update program using the determination as a trigger (S35). On the other hand, when the state determined on the basis of the charging and discharging information acquired in S36 is neither a charging mode nor a discharging mode, that is, is a standby mode (No in S36), the updating timing determination unit determines to execute the update program included in the updating information acquired in S31 by the updating information acquisition unit 12. The storage battery system 10 executes the update program using the determination as a trigger (S35).

Meanwhile, when charging and discharging are stopped in order to execute the update program (S37), it is also possible to restart charging and discharging after the update program is executed. The premise is the same as in all other exemplary embodiments.

According to the above-mentioned storage battery system 10 of the present exemplary embodiment, it is possible to realize the same operation and effect as those in the first exemplary embodiment.

In addition, it is possible to appropriately determine an execution timing of an update program on the basis of an execution deadline for an update program. For example, when there is time to spare until the execution deadline, the update program can be executed when the storage battery unit 11 is in a standby mode and cannot be executed when the storage battery unit is in a charging or discharging mode, and thus it is possible to avoid an inconvenience in that charging or discharging being performed by the storage battery unit 11 is forcibly stopped in order to execute the update program. On the other hand, when there is no time to spare until the execution deadline, it is possible to give priority to the execution of the update program and to update a control program of the storage battery system 10 after stopping charging and discharging being performed by the storage battery system 10.

In this manner, according to the present exemplary embodiment, it is possible to update a control program of the storage battery system 10 while suppressing as much as possible inconveniences that may occur due to the forcible stop of charging and discharging being performed by the storage battery system 10.

Meanwhile, as a modification example of the present exemplary embodiment, it is also possible to always give priority to not forcibly stopping charging and discharging being performed by the storage battery system 10 regardless of the degree of spare time before the execution deadline of the update program. That is, a configuration can be adopted in accordance with a flow of processing illustrated in the flow chart of FIG. 6. However, in this case, an inconvenience in that the update program cannot be executed until the deadline may occur. Consequently, a configuration may be adopted in which a user is notified of the presence of an update program and an updating deadline at a timing when a remaining time before the deadline is set to a predetermined value. With such a configuration, it is possible to stop the charging and discharging of the storage battery system 10 and to execute the update program in accordance with a user's operation at a predetermined timing.

Seventh Exemplary Embodiment

An example of a functional block diagram of a storage battery system 10 according to the present exemplary embodiment is illustrated in FIG. 3, similar to the first to sixth exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to sixth exemplary embodiments, and thus a description thereof will not be repeated herein.

The updating information acquisition unit 12 acquires updating information including deadline information indicating a deadline for completing an updating process. As illustrated in FIG. 10, the updating information acquired by the updating information acquisition unit 12 according to the present exemplary embodiment includes an update program and updating time information. Meanwhile, although not shown in the drawing, the updating information may further include the updating time information described in the fifth exemplary embodiment.

The charging and discharging information acquisition unit 13 acquires a charging and discharging schedule of the storage battery unit 11, as charging and discharging information. The charging and discharging schedule may be a charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

The updating timing determination unit 14 determines a timing at which an update program is executed, in consideration of a deadline which is specified by deadline information. For example, when a remaining time before a deadline is equal to or more than a predetermined value, the updating timing determination unit 14 determines to execute the update program during standby in the schedule. On the other hand, when the remaining time before the deadline is less than the predetermined value, the updating timing determination unit 14 can determine to execute the update program during standby, charging, or discharging in the schedule.

An example of a flow of processing of the storage battery system 10 according to the present exemplary embodiment can be configured in the same manner as the flow (see FIG. 11) in the sixth exemplary embodiment. That is, when the determination result in S32 is No after the processes of S31 and S32, the flow proceeds to S36 to perform the same processing, similar to the sixth exemplary embodiment. On the other hand, when the determination result in S32 is Yes, the updating timing determination unit 14 can perform processing according to a state of the current point in the schedule on the basis of a charging and discharging schedule (charging and discharging information), similar to the third and fourth exemplary embodiments.

According to the above-mentioned storage battery system 10 of the present exemplary embodiment, it is possible to realize the same operation and effect as those in the first exemplary embodiment.

In addition, it is possible to appropriately determine an execution timing of an update program on the basis of an execution deadline for an update program. For example, when there is time to spare until the execution deadline, the update program can be executed during standby in the schedule of the storage battery unit 11 and cannot be executed during charging or discharging in the schedule of the storage battery unit, and thus it is possible to avoid an inconvenience in that charging or discharging being performed by the storage battery unit 11 is forcibly stopped in order to execute the update program. On the other hand, when there is no time to spare until the execution deadline, it is possible to give priority to the execution of the update program and to update a control program of the storage battery system 10 after stopping charging and discharging being performed by the storage battery system 10.

In this manner, according to the present exemplary embodiment, it is possible to update a control program of the storage battery system 10 while suppressing as much as possible inconveniences that may occur due to the forcible stop of charging and discharging being performed by the storage battery system 10.

Eighth Exemplary Embodiment

An example of a functional block diagram of a storage battery system 10 according to the present exemplary embodiment is illustrated in FIG. 3, similar to the first to seventh exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to seventh exemplary embodiment, and thus a description thereof will not be repeated herein.

The updating information acquisition unit 12 acquires updating information including deadline information indicating a deadline for completing an updating process. As illustrated in FIG. 10, the updating information acquired by the updating information acquisition unit 12 according to the present exemplary embodiment includes an update program and deadline information. Meanwhile, although not shown in the drawing, the updating information may further include the updating time information described in the fifth exemplary embodiment.

The charging and discharging information acquisition unit 13 acquires a charging and discharging schedule of the storage battery unit 11, as charging and discharging information. The charging and discharging schedule may be a charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

The updating timing determination unit 14 determines a timing at which an update program is executed, in consideration of a deadline which is specified by deadline information. For example, when a remaining time before a deadline is equal to or more than a predetermined value, the updating timing determination unit 14 executes the update program so as to allow an updating process to be completed during standby in the schedule. On the other hand, when the remaining time before the deadline is less than the predetermined value, the updating timing determination unit 14 can determine a timing at which the update program is executed so as to execute the update program during standby, charging, or discharging in the schedule. For example, it is possible to determine a timing at which the update program is executed so as to execute at least a portion of the updating process during charging or discharging in the schedule.

An example of a flow of processing of the storage battery system 10 according to the present exemplary embodiment can be configured in the same manner as the flow (see FIG. 11) in the sixth exemplary embodiment. That is, when the determination result in S32 is No after the processes of S31 and S32, the flow proceeds to S36 to perform the same processing, similar to the sixth exemplary embodiment. On the other hand, when the determination result in S32 is Yes, the updating timing determination unit 14 can perform processing based on a charging and discharging schedule (charging and discharging information) and updating time information, similar to the fifth exemplary embodiment.

According to the above-mentioned storage battery system 10 of the present exemplary embodiment, it is possible to realize the same operation and effect as those in the first exemplary embodiment.

In addition, it is possible to appropriately determine an execution timing of an update program on the basis of an execution deadline for an update program. For example, when there is time to spare until the execution deadline, the update program can be executed so as to allow an updating process to be completed during standby in the schedule. For this reason, it is possible to avoid an inconvenience in that when the storage battery system 10 attempts to start a charging and discharging process on the basis of a charging and discharging schedule, the charging and discharging process cannot be started due to an update program being executed. As a result, it is possible to update a control program of the storage battery system 10 without disturbing charging and discharging performed by the storage battery system 10. On the other hand, when the remaining time before the deadline is less than the predetermined value, the updating timing determination unit 14 can give priority to the execution of the update program and to determine a timing at which the update program is executed so as to execute at least a portion of the updating process, for example, during charging or discharging in the schedule.

In this manner, according to the present exemplary embodiment, it is possible to update a control program of the storage battery system 10 while suppressing as much as possible inconveniences that may occur due to the forcible stop of charging and discharging being performed by the storage battery system 10.

Ninth Exemplary Embodiment

An example of a functional block diagram of a storage battery system 10 according to the present exemplary embodiment is illustrated in FIG. 3, similar to the first to eighth exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to eighth exemplary embodiments, and thus a description thereof will not be repeated herein.

Figure 12:
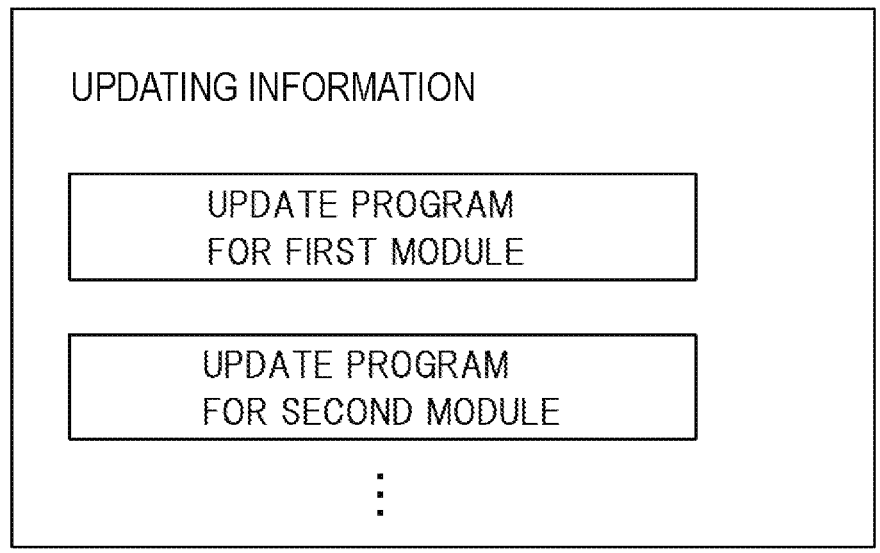
FIG. 12 is a schematic diagram illustrating an example of updating information according to the present exemplary embodiment.
Figure 13:
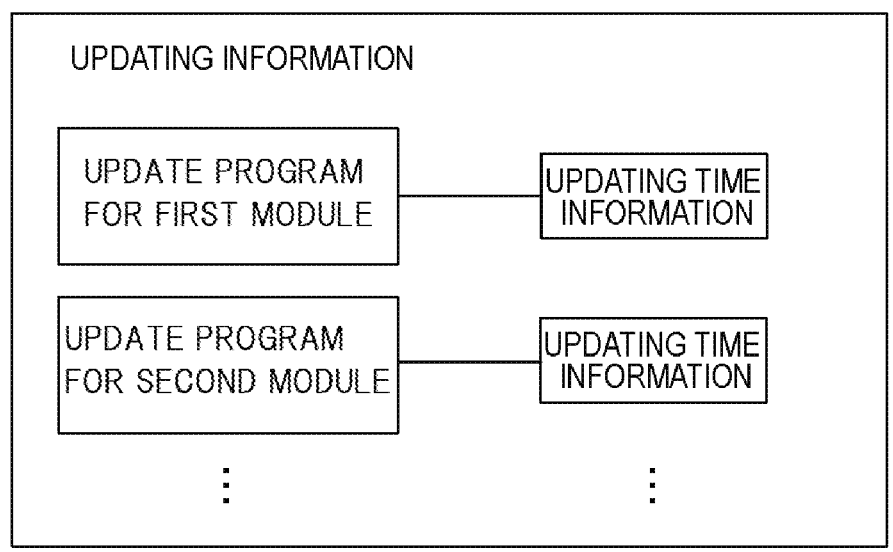
FIG. 13 is a schematic diagram illustrating an example of updating information according to the present exemplary embodiment.

The updating information acquisition unit 12 acquires updating information including a plurality of update programs for updating control programs for respectively controlling a plurality of modules included in the storage battery system 10. As illustrated in FIG. 12, the updating information acquired by the updating information acquisition unit 12 according to the present embodiment includes update programs for the plurality of respective modules. Meanwhile, the updating information may further include the updating time information described in the fifth exemplary embodiment. As illustrated in FIG. 13, the updating information may include pieces of updating time information respectively corresponding to the update programs for the plurality of respective modules. In addition, the updating information may include the deadline information described in the sixth exemplary embodiment.

The charging and discharging information acquisition unit 13 acquires a charging and discharging schedule of the storage battery unit 11, as charging and discharging information. The charging and discharging schedule may be a charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

When a remaining time before a deadline is equal to or more than a predetermined value, the updating timing determination unit 14 determines a timing at which an update program is executed so as to execute a plurality of update programs included in one piece of updating information at the same timing. On the other hand, when the remaining time before the deadline is less than the predetermined value, it is possible to determine a timing at which an update program is executed so at to execute the plurality of update programs included in one piece of updating information are executed at the same timing or different timings.

Here, the wording "the plurality of update programs being executed at the same timing" as used herein means that a deviation of a timing at which the execution of each of the plurality of update programs is started is smaller than a predetermined time difference or means that a deviation of a timing at which the execution of each of the plurality of update programs is ended is smaller than the predetermined time difference. On the other hand, the wording "the plurality of update programs being executed at different timings" as used herein means that a deviation of a timing at which the execution of each of the plurality of update programs is started is equal to or more than the predetermined time difference or means that a deviation of a timing at which the execution of each of the plurality of update programs is ended is equal to or more than the predetermined time difference.

Although it is not essential that the plurality of update programs included in one piece of updating information are executed at the same timing, it may be preferable that the update programs are executed at the same timing. For example, when the plurality of update programs are update programs for the plurality of respective modules, the plurality of update programs being executed at different timings may result in the occurrence of a situation in which versions of the plurality of modules are not aligned. The plurality of update programs included in one piece of updating information are executed at the same timing, and thus it is possible to avoid the occurrence of a situation in which versions of the plurality of modules are not aligned, or the like.

Figure 14:
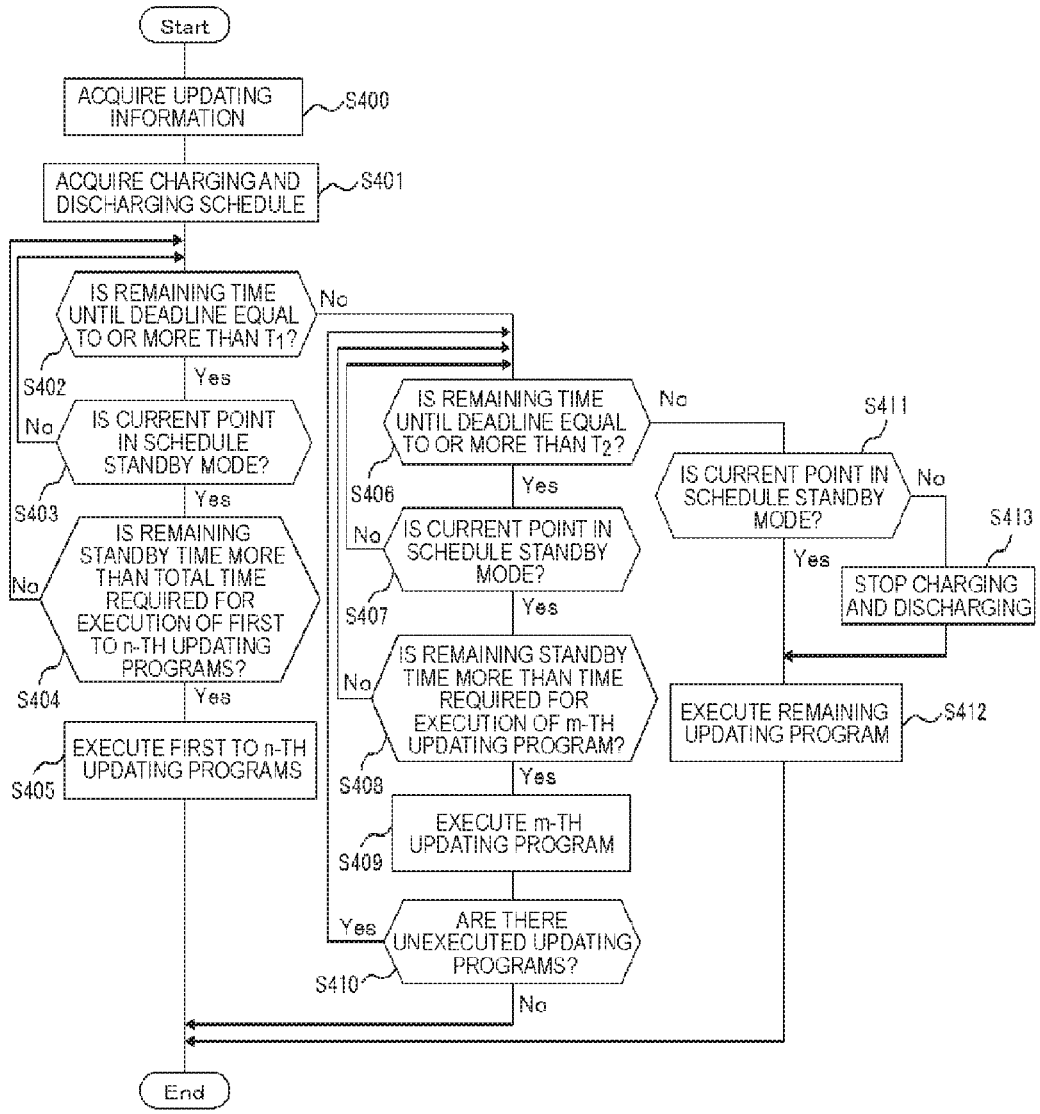
FIG. 14 is a flow chart illustrating an example of a flow of processing of a storage battery system according to the present exemplary embodiment.

Next, an example of a flow of processing of the storage battery system 10 according to the present exemplary embodiment will be described with reference to a flow chart of FIG. 14.

The updating information acquisition unit 12 acquires updating information including first to n-th update programs (S400). Then, the updating timing determination unit 14 acquires a charging and discharging schedule (charging and discharging information) through the charging and discharging information acquisition unit 13 at the subsequent predetermined timing (for example, using the acquisition of updating information by the updating information acquisition unit 12 as a trigger) (S401). For example, the charging and discharging information acquisition unit 13 acquires a charging and discharging schedule for a certain day from a management center at a predetermined timing (for example, 23 o'clock the day before, or the like), and stores the acquired charging and discharging schedule in the storage battery system 10. In S401, the updating timing determination unit 14 acquires the charging and discharging schedule stored in the storage battery system 10, through the charging and discharging information acquisition unit 13.

Next, the updating timing determination unit 14 extracts deadline information included in updating information and calculates a remaining time before a deadline specified by the deadline information. When the remaining time before the deadline is equal to or more than a predetermined value T1 (Yes in S402), the updating timing determination unit 14 confirms the current point in the charging and discharging schedule acquired in S401.

When the current point in the schedule is not a standby mode (No in S403), the updating timing determination unit 14 repeats the processes of S402 and S403 until the result in S402 is set to be No or the result in S403 is set to be Yes.

When the current point in the schedule is a standby mode (Yes in S403), the updating timing determination unit 14 ascertains a time for which the standby mode is continued after this, on the basis of the charging and discharging schedule. For example, when contents of the charging and discharging schedule acquired in S401 are shown in FIG. 5 and the current time is 6:00 o'clock, the updating timing determination unit 14 determines that the current point in the schedule is a standby mode and the state (standby) is continued for 2 hours after this (until 8 o'clock). Thereafter, the updating timing determination unit 14 determines whether the time for which the standby mode is continued (remaining standby time) is more than an estimated total time required for the execution of all of the first to n-th update programs included in the updating information acquired in S400, using updating time information included in updating information (S404).

When the time for which the standby mode is continued (remaining standby time) is more than the estimated total time (Yes in S404), the updating timing determination unit 14 determines to execute all of the first to n-th update programs included in the updating information acquired in S400 by the updating information acquisition unit 12. The storage battery system 10 executes the first to n-th update programs using the determination as a trigger (S405).

On the other hand, when the time for which the standby mode is continued (remaining standby time) is less than the estimated total time (No in S404), the updating timing determination unit 14 repeats the processes of S402 to S404 until the result in S402 is set to be No or the result in S404 is set to be Yes.

Meanwhile, as a result of the determination in S402, when the remaining time before the deadline is less than the predetermined value T1 (No in S402), the flow proceeds to S406, and the updating timing determination unit 14 determines whether the remaining time before the deadline is equal to or more than a predetermined value T2 (can be appropriately determined in a range of less than T1). When the remaining time before the deadline is equal to or more than the predetermined value T2 (Yes in S406), the flow proceeds to S407. On the other hand, when the remaining time before the deadline is less than the predetermined value T2 (No in S406), the flow proceeds to S411.

In S407, the updating timing determination unit 14 confirms the current point in the charging and discharging schedule acquired in S401. When the current point in the schedule is not a standby mode (No in S407), the updating timing determination unit 14 repeats the processes of S406 and S407 until the result in S406 is set to be No or the result in S407 is set to be Yes.

When the current point in the schedule is a standby mode (Yes in S407), the updating timing determination unit 14 ascertains a time for which the standby mode is continued after this, on the basis of the charging and discharging schedule. Thereafter, the updating timing determination unit 14 determines whether the time for which the standby mode is continued (remaining standby time) is more than an estimated time required for the execution of any of the first to n-th update programs included in the updating information acquired in S400, using updating time information included in updating information (S408).

When the time for which the standby mode is continued (remaining standby time) is more than the estimated time (Yes in S408), the updating timing determination unit 14 determines to execute an m-th update program of which the estimated time required for the execution is less than the time for which the standby mode is continued (remaining standby time), among the first to n-th update programs included in the updating information acquired in S400 by the updating information acquisition unit 12. The storage battery system 10 executes the m-th update program using the determination as a trigger (S409).

Thereafter, when an update program having not yet been executed is present (Yes in S410), the flow returns to S406 to repeat the process. On the other hand, when an update program having not yet been executed is not present (No in S410), the process is ended.

In S411, the updating timing determination unit 14 confirms the current point in the charging and discharging schedule acquired in S401. When the current point in the schedule is not a standby mode (No in S411), the updating timing determination unit 14 stops charging and discharging performed by the storage battery unit 11 (S413), and then determines to execute all of the update programs having not yet been executed among the first to n-th update programs included in the updating information acquired in S400 by the updating information acquisition unit 12. The storage battery system 10 executes the update programs having not yet been executed, using the determination as a trigger (S412).

On the other hand, when the current point in the schedule is a standby mode (Yes in S411), the updating timing determination unit 14 determines to execute all of the update programs having not yet been executed among the first to n-th update programs included in the updating information acquired in S400 by the updating information acquisition unit 12. The storage battery system 10 executes the update programs having not yet been executed, using the determination as a trigger (S412).

According to the above-mentioned storage battery system 10 of the present exemplary embodiment, it is possible to realize the same operation and effect as those in the first exemplary embodiment.

In addition, it is possible to appropriately determine an execution timing of an update program, an execution method thereof, and the like on the basis of an execution deadline of the update program. For example, when there is time to spare until the execution deadline, the storage battery system 10 can execute a plurality of update programs included in updating information at the same timing. As a result, it is possible to obtain an effect allowing reduction of the occurrence of a situation in which versions of the plurality of modules are not aligned. On the other hand, when there is no time to spare until the execution deadline, the updating timing determination unit 14 can give priority to the execution of the update program and executes the plurality of update programs included in the updating information at different timings.

In this manner, according to the present exemplary embodiment, it is possible to appropriately determine an execution timing of an update program, an execution method thereof, and the like in accordance with the degree of spare time until the execution deadline of the update program.

Tenth Exemplary Embodiment

An example of a functional block diagram of a storage battery system 10 according to the present exemplary embodiment is illustrated in FIG. 3, similar to the first to ninth exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to ninth exemplary embodiments, and thus a description thereof will not be repeated herein.

Figure 15:
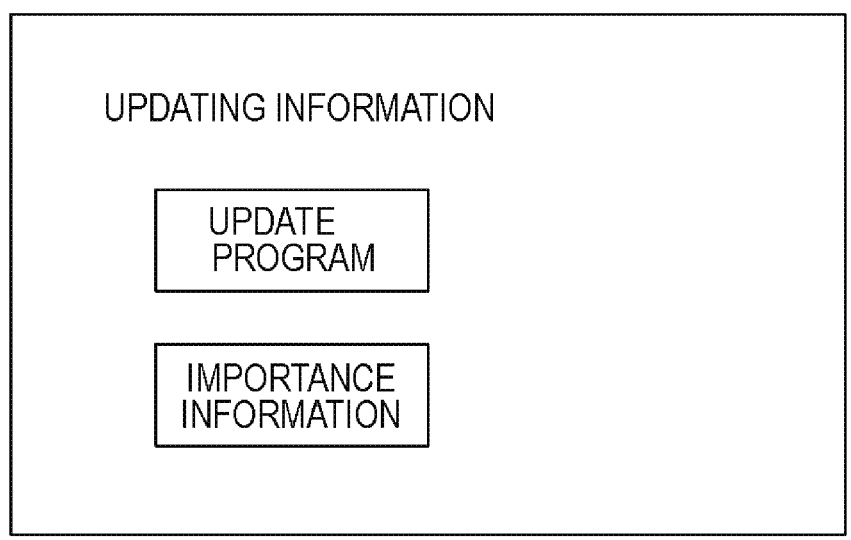
FIG. 15 is a schematic diagram illustrating an example of updating information according to the present exemplary embodiment.

The updating information acquisition unit 12 acquires updating information including importance information indicating the importance of an updating process. As illustrated in FIG. 15, the updating information acquired by the updating information acquisition unit 12 according to the present exemplary embodiment includes an update program and importance information. Meanwhile, although not shown in the drawing, the updating information may also include the updating time information described in the fifth exemplary embodiment or the deadline information described in the sixth exemplary embodiment. In addition, although not shown in the drawing, the updating information may include a plurality of update programs as described in the ninth exemplary embodiment.

The charging and discharging information acquisition unit 13 acquires information indicating the current state of the storage battery unit 11 as charging and discharging information. The charging and discharging information acquisition unit 13 can acquire the charging and discharging information from the storage battery unit 11.

The updating timing determination unit 14 determines a timing at which an update program is executed, in consideration of importance which is specified by importance information. For example, when the importance is equal to or less than a predetermined level, the updating timing determination unit 14 determines to execute the update program when the state of the storage battery unit 11 is a standby mode. On the other hand, when the importance is higher than the predetermined level, the updating timing determination unit 14 can determine to execute the update program when the state of the storage battery unit 11 is a standby mode, a charging mode, or a discharging mode.

Figure 16:
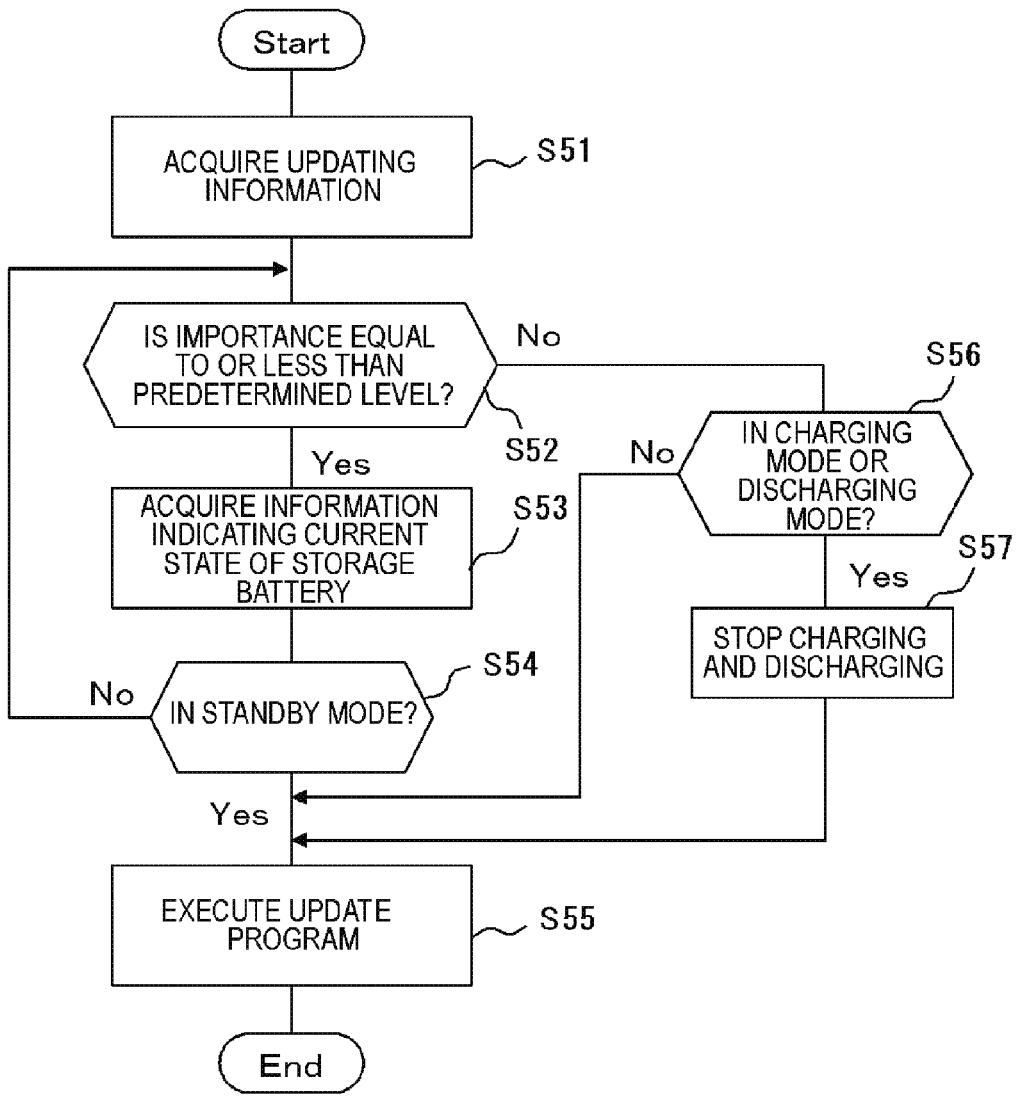
FIG. 16 is a flow chart illustrating an example of a flow of processing of a storage battery system according to the present exemplary embodiment.

Next, an example of a flow of processing of the storage battery system 10 according to the present exemplary embodiment will be described with reference to a flow chart of FIG. 16.

When the updating information acquisition unit 12 acquires updating information (S51), the updating timing determination unit 14 extracts importance information included in the updating information and recognizes importance which is specified by the importance information. When the importance is equal to or less than the predetermined level (Yes in S52), the updating timing determination unit 14 thereafter acquires information (charging and discharging information) indicating the current state (any of a charging mode, a discharging mode, and a standby mode) of the storage battery unit 11 through the charging and discharging information acquisition unit 13 (S53).

When the state specified by the charging and discharging information acquired in S53 is not a standby mode (No in S54), the updating timing determination unit 14 repeats the processes of S52 to S54 until the result in S52 is set to be No or the result in S54 is set to be Yes. Meanwhile, an interval of the repetition of a process of a set of the processes of S52 to S54 is a matter of design. For example, the updating timing determination unit 14 may perform the process at predetermined time intervals, for example, every 5 minutes or every 30 minutes.

On the other hand, when the state determined on the basis of the charging and discharging information acquired in S53 is a standby mode (Yes in S54), the updating timing determination unit 14 determines to execute an update program included in the updating information acquired in S51 by the updating information acquisition unit 12. The storage battery system 10 executes the update program using the determination as a trigger (S55).

Meanwhile, as a result of the determination in S52, when the importance is higher than the predetermined level (No in S52), the flow proceeds to S56. In S56, the updating timing determination unit 14 acquires information (charging and discharging information) indicating the current state (any of a charging mode, a discharging mode, and a standby mode) of the storage battery unit 11 through the charging and discharging information acquisition unit 13. When the state determined on the basis of the acquired charging and discharging information is a charging mode or a discharging mode (Yes in S56), the updating timing determination unit stops charging and discharging performed by the storage battery unit 11 (S57) and then determines to execute the update program included in the updating information acquired in S51 by the updating information acquisition unit 12. The storage battery system 10 executes the update program using the determination as a trigger (S55). On the other hand, when the state determined on the basis of the charging and discharging information acquired in S56 is neither a charging mode nor a discharging mode, that is, is a standby mode (No in S56), the updating timing determination unit determines to execute the update program included in the updating information acquired in S51 by the updating information acquisition unit 12. The storage battery system 10 executes the update program using the determination as a trigger (S55).

According to the above-mentioned storage battery system 10 of the present exemplary embodiment, it is possible to realize the same operation and effect as those in the first exemplary embodiment.

In addition, it is possible to appropriately determine an execution timing of an update program on the basis of the importance of an update program. For example, when the importance of the update program is low, the update program can be executed when the storage battery unit 11 is in a standby mode and cannot be executed when the storage battery unit is in a charging or discharging mode, and thus it is possible to avoid an inconvenience in that charging or discharging being performed by the storage battery unit 11 is forcibly stopped in order to execute the update program. On the other hand, when the importance of the update program is high, it is possible to give priority to the execution of the update program and to update a control program of the storage battery system 10 after stopping charging and discharging being performed by the storage battery system 10.

In this manner, according to the present exemplary embodiment, it is possible to execute the update program at an appropriate timing. As a result, it is possible to update a control program of the storage battery system 10 while suppressing as much as possible inconveniences that may occur due to the forcible stop of charging and discharging being performed by the storage battery system 10.

Eleventh Exemplary Embodiment

An example of a functional block diagram of a storage battery system 10 according to the present exemplary embodiment is illustrated in FIG. 3, similar to the first to tenth exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to tenth exemplary embodiments, and thus a description thereof will not be repeated herein.

The updating information acquisition unit 12 acquires updating information including importance information indicating the importance of an updating process. As illustrated in FIG. 15, the updating information acquired by the updating information acquisition unit 12 according to the present exemplary embodiment includes an update program and importance information. Meanwhile, although not shown in the drawing, the updating information may also include the updating time information described in the fifth exemplary embodiment or the deadline information described in the sixth exemplary embodiment. In addition, although not shown in the drawing, the updating information may include a plurality of update programs as described in the ninth exemplary embodiment.

The charging and discharging information acquisition unit 13 acquires a charging and discharging schedule of the storage battery unit 11, as charging and discharging information. The charging and discharging schedule may be charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

The updating timing determination unit 14 determines a timing at which an update program is executed, in consideration of importance which is specified by importance information. For example, when the importance is equal to or less than the predetermined level, the updating timing determination unit 14 determines to execute the update program during standby in the schedule. On the other hand, when the importance is higher than the predetermined level, the updating timing determination unit 14 can determine to execute the update program during standby, charging, or discharging in the schedule.

An example of a flow of processing of the storage battery system 10 according to the present exemplary embodiment can be configured in the same manner as the flow (see FIG. 16) in the tenth exemplary embodiment. That is, when the determination result in S52 is No after the processes of S51 and S52, the flow proceeds to S56 to perform the same processing, similar to the tenth exemplary embodiment. On the other hand, when the determination result in S52 is Yes, the updating timing determination unit 14 can perform processing according to a state of the current point in the schedule on the basis of a charging and discharging schedule (charging and discharging information), similar to the third and fourth exemplary embodiments.

According to the above-mentioned storage battery system 10 of the present exemplary embodiment, it is possible to realize the same operation and effect as those in the first exemplary embodiment.

In addition, it is possible to appropriately determine an execution timing of an update program on the basis of the importance of the update program. For example, when the importance of the update program is low, the update program can be executed when the storage battery unit 11 is scheduled for standby and cannot be executed when the storage battery unit is scheduled for charging or discharging, and thus it is possible to avoid an inconvenience in that charging and discharging being performed by the storage battery unit 11 is forcibly stopped in order to execute the update program. On the other hand, when the importance of the update program is high, it is possible to give priority to the execution of the update program and to update a control program of the storage battery system 10 after stopping charging and discharging being performed by the storage battery system 10.

In this manner, according to the present exemplary embodiment, it is possible to execute the update program at an appropriate timing. As a result, it is possible to update a control program of the storage battery system 10 while suppressing as much as possible inconveniences that may occur due to the forcible stop of charging and discharging being performed by the storage battery system 10.

Twelfth Exemplary Embodiment

An example of a functional block diagram of a storage battery system 10 according to the present exemplary embodiment is illustrated in FIG. 3, similar to the first to eleventh exemplary embodiments. As illustrated in the drawing, the storage battery system 10 according to the present exemplary embodiment includes a storage battery unit 11, an updating information acquisition unit 12, a charging and discharging information acquisition unit 13, and an updating timing determination unit 14. The configuration of the storage battery unit 11 is the same as those in the first to eleventh exemplary embodiments, and thus a description thereof will not be repeated herein.

The updating information acquisition unit 12 acquires updating information including importance information indicating the importance of an updating process. As illustrated in FIG. 15, the updating information acquired by the updating information acquisition unit 12 according to the present exemplary embodiment includes an update program and importance information. Meanwhile, although not shown in the drawing, the updating information may also include the updating time information described in the fifth exemplary embodiment or the deadline information described in the sixth exemplary embodiment. In addition, although not shown in the drawing, the updating information may include a plurality of update programs as described in the ninth exemplary embodiment.

The charging and discharging information acquisition unit 13 acquires a charging and discharging schedule of the storage battery unit 11, as charging and discharging information. The charging and discharging schedule may be a charging and discharging prediction schedule which is determined on the basis of the past history of charging and discharging of the storage battery unit 11. Such a configuration of the charging and discharging information acquisition unit 13 has been described in the first, third, and fourth exemplary embodiments, and thus a description thereof will not be repeated herein.

The updating timing determination unit 14 determines a timing at which an update program is executed, in consideration of importance which is specified by importance information. For example, when the importance is equal to or less than the predetermined level, the updating timing determination unit 14 determines a timing at which the update program is executed so as to allow an updating process to be completed during standby in the schedule. On the other hand, when the importance is higher than the predetermined level, the updating timing determination unit 14 can determine a timing at which the update program is executed so as to execute the updating process during standby, charging, or discharging in the schedule. For example, the updating timing determination unit 14 can determine a timing at which the update program is executed so as to execute at least a portion of the updating process during charging or discharging in the schedule.

An example of a flow of processing of the storage battery system 10 according to the present exemplary embodiment can be configured in the same manner as the flow (see FIG. 16) in the tenth exemplary embodiment. That is, when the determination result in S52 is No after the processes of S51 and S52, the flow proceeds to S56 to perform the same processing, similar to the tenth exemplary embodiment. On the other hand, when the determination result in S52 is Yes, the updating timing determination unit 14 can perform processing based on a charging and discharging schedule (charging and discharging information) and updating time information, similar to the fifth exemplary embodiment.

According to the above-mentioned storage battery system 10 of the present exemplary embodiment, it is possible to realize the same operation and effect as those in the first exemplary embodiment.

In addition, it is possible to appropriately determine an execution timing of an update program on the basis of the importance of an update program. For example, when the importance is low, the update program can be executed so as to allow an updating process to be completed during standby in the schedule. For this reason, it is possible to avoid an inconvenience in that the charging and discharging process cannot be started as an update program is being executed when the storage battery system 10 attempts to start a charging and discharging process on the basis of a charging and discharging schedule. As a result, it is possible to update a control program of the storage battery system 10 without disturbing charging and discharging performed by the storage battery system 10. On the other hand, when the importance is high, the updating timing determination unit 14 can give priority to the execution of the update program and determines a timing at which the update program is executed so as to execute at least a portion of the updating process during charging or discharging in the schedule.

In this manner, according to the present exemplary embodiment, it is possible to update a control program of the storage battery system 10 while suppressing as much as possible inconveniences that may occur due to the forcible stop of charging and discharging being performed by the storage battery system 10.

Thirteenth Exemplary Embodiment

Figure 17:
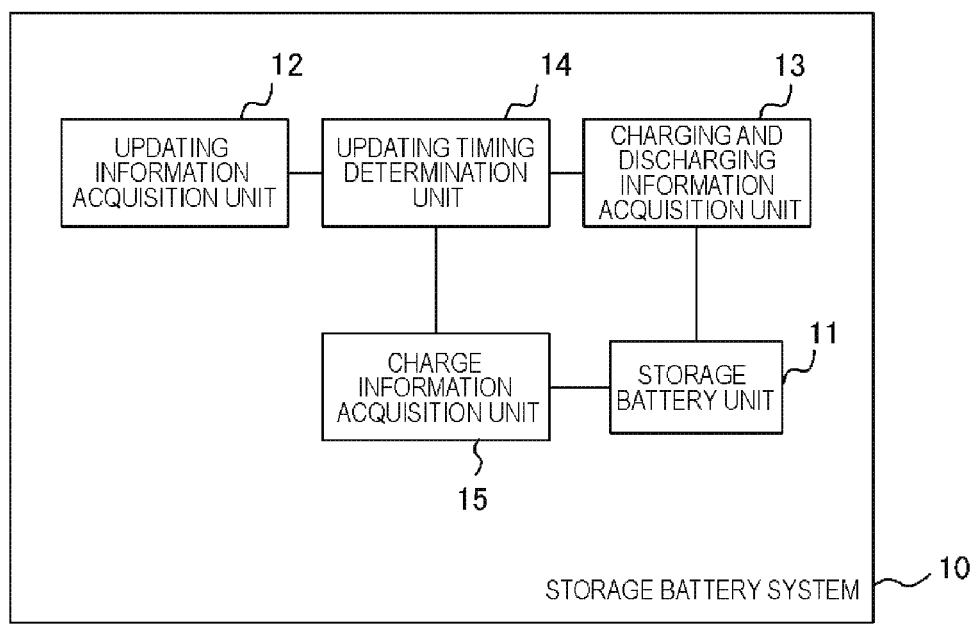
FIG. 17 is a diagram illustrating an example of a functional block diagram of a storage battery system according to the present exemplary embodiment.

An example of a functional block diagram of a storage battery system 10 according to the present exemplary embodiment is illustrated in FIG. 17. As illustrated in the drawing, the storage battery system 10 according to the present exemplary embodiment includes a storage battery unit 11, an updating information acquisition unit 12, a charging and discharging information acquisition unit 13, an updating timing determination unit 14, and a charge information acquisition unit 15. The configurations of the storage battery unit 11, the updating information acquisition unit 12, and the charging and discharging information acquisition unit 13 are the same as those in the first to twelfth exemplary embodiments, and thus a description thereof will not be repeated herein.

The charge information acquisition unit 15 acquires charge information indicating a remaining amount of charge of the storage battery unit 11. The charge information may be, for example, a State Of Charge (SOC) of the storage battery unit 11, or may be a voltage value. A unit of acquiring the pieces of information of the storage battery unit 11 can be realized using any technique of the related art.

When the remaining amount of charge of the storage battery unit 11 which is specified by the charge information is equal to or higher than a predetermined level, the updating timing determination unit 14 determines to execute an update program. The inventor empirically confirms that an updating process may not be normally completed when the update program is executed in a state where the remaining amount of charge of the storage battery unit 11 is less than the predetermined level. In addition, the inventor confirms that such an inconvenience occurs also in a case where the storage battery system 10 is connected to an electric power system and an update program is executed using power from the electric power system. Consequently, in the present exemplary embodiment, the updating timing determination unit 14 determines to execute the update program when the remaining amount of charge of the storage battery unit 11 which is specified by the charge information is equal to or higher than the predetermined level. Thereby, it is possible to suppress the occurrence of an inconvenience in that the updating process is not normally completed.

Next, an example of a flow of processing of the storage battery system 10 according to the present exemplary embodiment will be described with reference to a flow chart of FIG. 18.

When the updating information acquisition unit 12 acquires updating information (S61), the updating timing determination unit 14 acquires information (charging and discharging information) indicating the current state (any of a charging mode, a discharging mode, and a standby mode) of the storage battery unit 11 through the charging and discharging information acquisition unit 13 at the subsequent predetermined timing (for example, using the acquisition of updating information by the updating information acquisition unit 12 as a trigger) (S62).

When the state determined on the basis of the charging and discharging information acquired in S62 is not a standby mode (No in S63), the updating timing determination unit 14 repeats the processes of S62 and S63 until the state determined on the basis of the charging and discharging information is set to be a standby mode. Meanwhile, an interval of the repetition of a process of a set of the acquisition in S62 and the determination in S63 is a matter of design. For example, the updating timing determination unit 14 may perform the process at predetermined time intervals, for example, every 5 minutes or every 30 minutes.

On the other hand, when the state determined on the basis of the charging and discharging information acquired in S62 is a standby mode (Yes in S63), the updating timing determination unit 14 acquires charge information through the charge information acquisition unit 15. Here, it is assumed that the updating timing determination unit 14 acquires information indicating an SOC of the storage battery unit 11 as charge information. Thereafter, the updating timing determination unit 14 determines whether the SOC is equal to or greater than a predetermined value which is determined in advance (S64).

When the SOC is less than the predetermined value which is determined in advance (No in S64), the updating timing determination unit 14 repeats the processes of S62, S63 and S64 until the result in S64 is set to be Yes. On the other hand, when the SOC is equal to or greater than the predetermined value which is determined in advance (Yes in S64), the updating timing determination unit 14 determines to execute an update program included in the updating information acquired in S61 by the updating information acquisition unit 12. The storage battery system 10 executes the update program using the determination as a trigger (S65).

Figure 18:
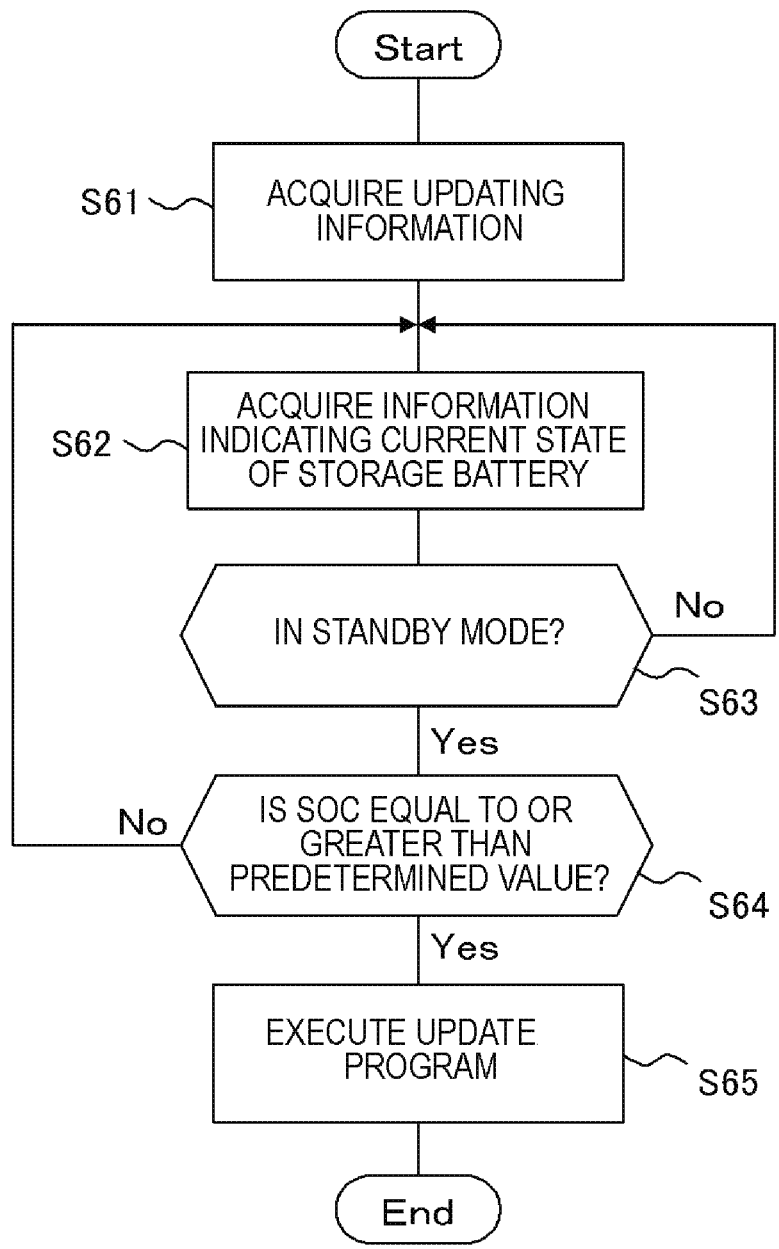
FIG. 18 is a flow chart illustrating an example of a flow of processing of a storage battery system according to the present exemplary embodiment.

Meanwhile, as another example of a flow of processing, for example, the process of S64 in FIG. 18 may be placed at a predetermined position of each of the flow charts of FIGS. 7, 9, 11, 14, and 16.

According to the above-mentioned storage battery system 10 of the present exemplary embodiment, it is possible to realize the same operation and effect as those in the first exemplary embodiment.

In addition, an update program can be executed when the remaining amount of charge of the storage battery unit 11 is equal to or higher than the predetermined level and cannot be executed when the remaining amount of charge is lower than the predetermined level, and thus it is possible to suppress the occurrence of an inconvenience in that an updating process is not normally completed due to the remaining amount of charge of the storage battery unit 11 being lower than the predetermined level.

Fourteenth Exemplary Embodiment

Figure 19:
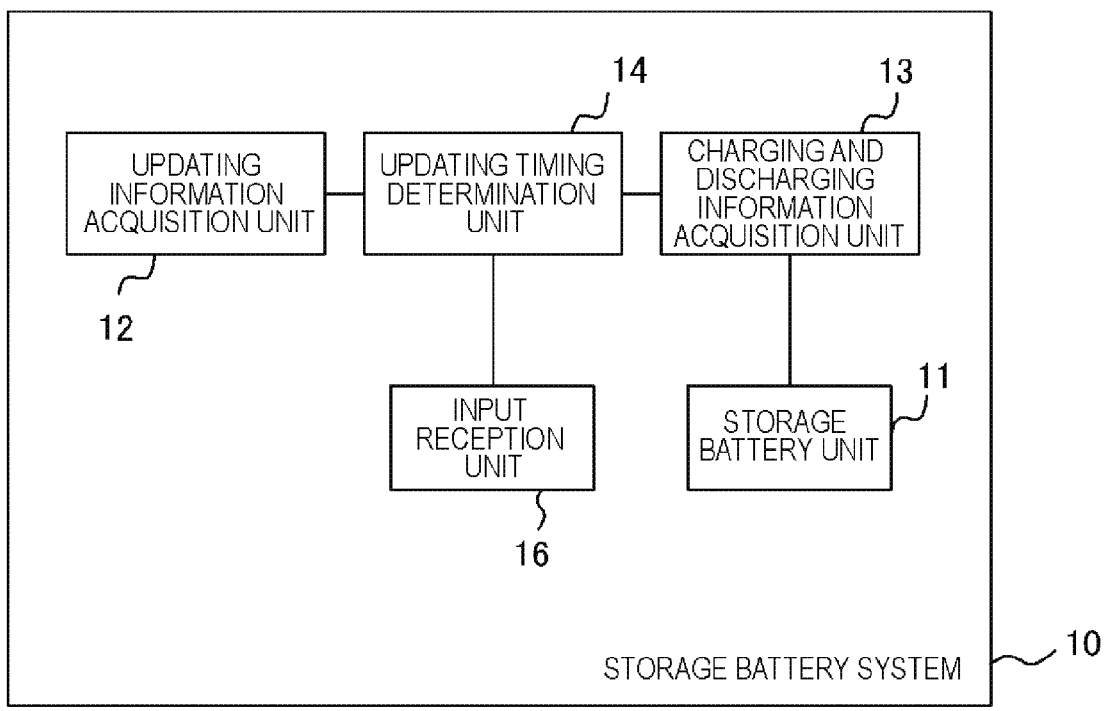
FIG. 19 is a diagram illustrating an example of a functional block diagram of a storage battery system according to the present exemplary embodiment.

An example of a functional block diagram of a storage battery system 10 according to the present exemplary embodiment is illustrated in FIG. 19. As illustrated in the drawing, the storage battery system 10 according to the present exemplary embodiment includes a storage battery unit 11, an updating information acquisition unit 12, a charging and discharging information acquisition unit 13, an updating timing determination unit 14, and an input reception unit 16. Meanwhile, the storage battery system may further include a charge information acquisition unit 15. The configurations of the storage battery unit 11, the updating information acquisition unit 12, the charging and discharging information acquisition unit 13, and the charge information acquisition unit 15 are the same as those in the first to thirteenth exemplary embodiments, and thus a description thereof will not be repeated herein.

The input reception unit 16 receives a user's input of permission time information indicating a time when the execution of an update program is permitted. The permission time information may be, for example, a time period (for example, from 0 o'clock to 6 o'clock) in a day, a day of the week (for example, Monday), or a combination thereof. For example, the user can input a time when the storage battery system 10 is not used (is not charged or discharged), as a time when the execution of the update program is permitted.

Meanwhile, the input reception unit 16 may be able to receive a user's input of non-permission time information indicating a time when the execution of an update program is not permitted, in addition to or instead of the permission time information. The non-permission time information may be, for example, a time period (for example, from 0 o'clock to 6 o'clock) in a day, a day of the week (for example, Monday), or a combination thereof. For example, the user can input a time when the storage battery system 10 is used (is charged or discharged), as a time when the execution of the update program is not permitted.

A unit of making the input reception unit 16 receive of inputs the permission time information and the non-permission time information is not particularly limited, and can be realized through any input device such as operation keys, operation buttons, switches, a jog dial, a touch pad, a touch panel, or a microphone.

The updating timing determination unit 14 determines to execute an update program at the time when the execution of the update program is permitted, which is specified by the permission time information. In addition, the updating timing determination unit 14 determines to execute the update program at a time except for the time when the execution of the update program is not permitted, which is specified by the non-permission time information.

Next, an example of a flow of processing of the storage battery system 10 according to the present exemplary embodiment will be described with reference to a flow chart of FIG. 20.

When the updating information acquisition unit 12 acquires updating information (S71), the updating timing determination unit 14 acquires information (charging and discharging information) indicating the current state (any of a charging mode, a discharging mode, and a standby mode) of the storage battery unit 11 through the charging and discharging information acquisition unit 13 at the subsequent predetermined timing (for example, using the acquisition of updating information by the updating information acquisition unit 12 as a trigger) (S72).

When the state determined on the basis of the charging and discharging information acquired in S72 is not a standby mode (No in S73), the updating timing determination unit 14 repeats the processes of S72 and S73 until the state determined on the basis of the charging and discharging information is set to be a standby mode. Meanwhile, an interval of the repetition of a process of a set of the acquisition in S72 and the determination in S73 is a matter of design. For example, the updating timing determination unit 14 may repeat the process at predetermined time intervals, for example, every 5 minutes or every 30 minutes.

On the other hand, when the state determined on the basis of the charging and discharging information acquired in S72 is a standby mode (Yes in S73), the updating timing determination unit 14 determines whether the current point in time is a timing at which the execution of the update program is permitted by a user, on the basis of the permission time information and/or the non-permission time information which is acquired by the input reception unit 16 (S74).

When the current point in time is not the timing at which the execution of the update program is permitted by the user (No in S74), the updating timing determination unit 14 repeats the processes of S72, S73 and S74 until the result in S74 is set to be Yes. On the other hand, when the current point in time is the timing at which the execution of the update program is permitted by the user (Yes in S74), the updating timing determination unit 14 determines to execute the update program included in the updating information acquired in S71 by the updating information acquisition unit 12. The storage battery system 10 executes the update program using the determination as a trigger (S75).

Figure 20:
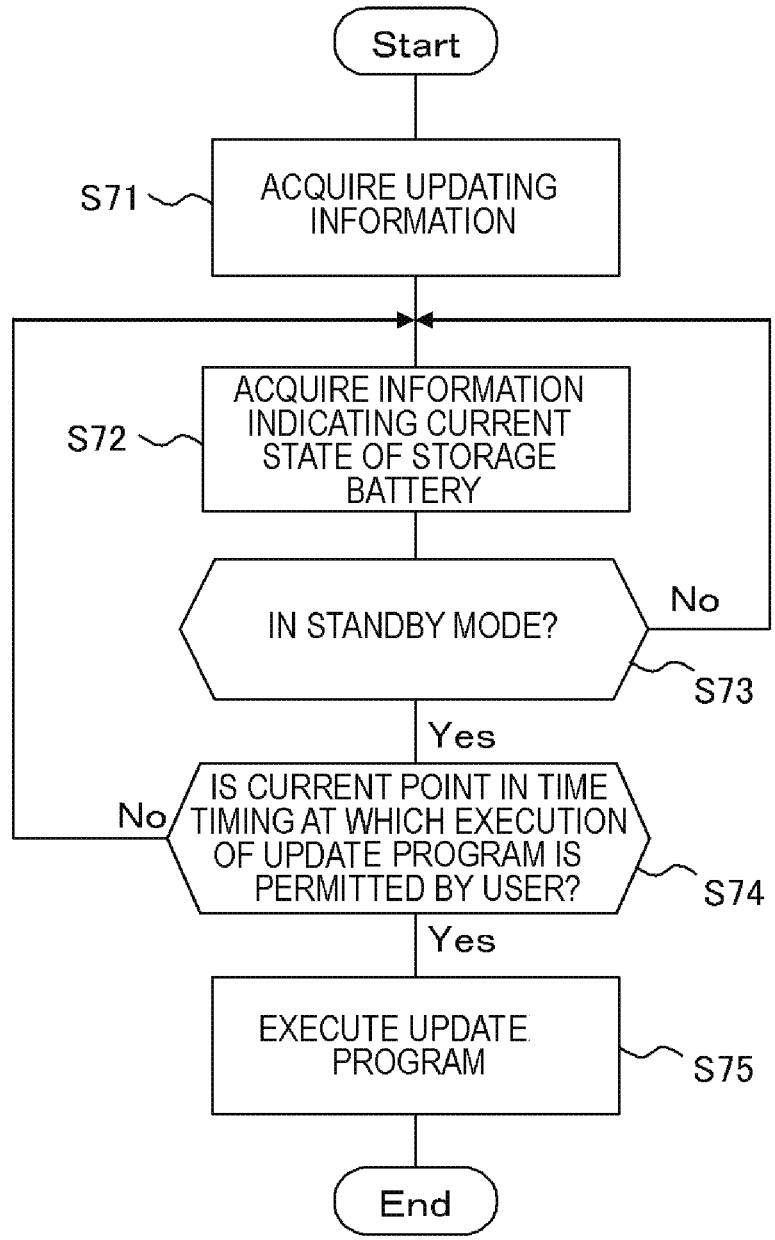
FIG. 20 is a flow chart illustrating an example of a flow of processing of a storage battery system according to the present exemplary embodiment.

Meanwhile, as another example of a flow of processing, for example, the process of S74 in FIG. 20 may be placed at a predetermined position of each of the flowcharts of FIGS. 7, 9, 11, 14, 16, and 18.

According to the above-mentioned storage battery system 10 of the present exemplary embodiment, it is possible to realize the same operation and effect as those in the first exemplary embodiment.

In addition, according to the present exemplary embodiment, it is possible to execute an update program within a user's desired time. In addition, it is possible to prevent an update program from being executed within a user's undesired time. That is, it is possible to execute an update program at a timing that meets a user's desire.

Hereinafter, an example of a reference configuration will be appended.

1. A storage battery system including a storage battery that performs power charging and discharging, wherein the storage battery determines whether the storage battery is in a discharging state, and determines a timing at which an update program for updating a control program for controlling the storage battery system is executed on the basis of the determination.

2. The storage battery system according to 1,
wherein it is determined which state of charging, discharging, or standby the storage battery is in.

3. The storage battery system according to 1 or 2,
wherein the determination is performed on the basis of a current state of the storage battery.

4. The storage battery system according to any one of 1 to 3, including:
an updating information acquisition unit that acquires updating information including the update program;
a charging and discharging information acquisition unit that acquires charging and discharging information for determining which mode of charging, discharging, and standby a state of the storage battery is; and
an updating timing determination unit that determines a timing at which the update program is executed, using the charging and discharging information.

5. The storage battery system according to 4,
wherein the updating timing determination unit determines to execute the update program when the state of the storage battery is a standby mode.

6. The storage battery system according to 4,
wherein the charging and discharging information acquisition unit acquires a charging and discharging schedule of the storage battery, as the charging and discharging information.

7. The storage battery system according to 6,
wherein the updating timing determination unit determines to execute the update program during standby in the schedule.

8. The storage battery system according to 6 or 7,
wherein the charging and discharging information acquisition unit acquires a charging and discharging prediction schedule which is determined on the basis of a past history of charging and discharging of the storage battery, as the charging and discharging schedule.

9. The storage battery system according to any one of 4 to 8,
wherein the updating information acquisition unit acquires the updating information including updating time information roughly indicating an estimated period of time from execution of the update program to completion of an updating process, and
wherein the updating timing determination unit determines a timing at which the update program is executed, in consideration of the period of time which is specified by the updating time information.

10. The storage battery system according to 9 dependent upon any one of 6 to 8,
wherein the updating timing determination unit determines a timing at which the update program is executed so as to allow the updating process to be completed during standby in the schedule, on the basis of the charging and discharging schedule and the updating time information.

11. The storage battery system according to any one of 4 to 10,
wherein the updating information acquisition unit acquires the updating information including deadline information indicating a deadline for completing the updating process, and
wherein the updating timing determination unit determines a timing at which the update program is executed, in consideration of the deadline which is specified by the deadline information.

12. The storage battery system according to 11,
wherein the updating timing determination unit
determines to execute the update program when the state of the storage battery is a standby mode in a case where a remaining time before the deadline is equal to or longer than a predetermined value, and
determines to execute the update program when the state of the storage battery is any of a charging mode, a discharging mode and a standby mode in a case where the remaining time before the deadline is less than the predetermined value.

13. The storage battery system according to 11 dependent upon 6,
wherein the updating timing determination unit
determines to execute the update program during standby in the schedule when a remaining time before the deadline is equal to or longer than a predetermined value, and
determines to execute the update program during any of charging, discharging, and standby in the schedule when the remaining time before the deadline is less than the predetermined value.

14. The storage battery system according to 11 dependent upon 10,
wherein the updating timing determination unit
determines a timing at which the update program is executed so as to allow an updating process to be completed during standby in the schedule when a remaining time before the deadline is equal to or longer than a predetermined value, and
determines a timing at which the update program is executed so as to execute at least a portion of an updating process any of charging, discharging, and standby in the schedule when the remaining time before the deadline is less than the predetermined value.

15. The storage battery system according to 11,
wherein the updating information acquisition unit acquires the updating information including a plurality of the update programs for updating the control programs for controlling a plurality of respective modules included in the storage battery system, and
wherein the updating timing determination unit
determines a timing at which the update program is executed so as to execute the plurality of update programs at the same timing when a remaining time before the deadline is equal to or longer than a predetermined value, and
determines a timing at which the update program is executed so as to execute the plurality of update programs at different timings or at the same timing when the remaining time before the deadline is less than the predetermined value.

16. The storage battery system according to any one of 4 to 15,
wherein the updating information acquisition unit acquires the updating information including importance information indicating importance of an updating process, and
wherein the updating timing determination unit determines a timing at which the update program is executed, in consideration of importance which is specified by the importance information.

17. The storage battery system according to 16,
wherein the updating timing determination unit
determines to execute the update program when the state of the storage battery is a standby mode in a case where the importance is equal to or less than a predetermined level, and
determines to execute the update program when the state of the storage battery is any of a charging mode, a discharging mode, and a standby mode in a case where the importance is higher than the predetermined level.

18. The storage battery system according to 16 dependent upon 6,
wherein the updating timing determination unit
determines to execute the update program during standby in the schedule when the importance is equal to or less than a predetermined level, and
determines to execute the update program during any of charging, discharging, and standby in the schedule when the importance is higher than the predetermined level.

19. The storage battery system according to 16 dependent upon 10,
wherein the updating timing determination unit
determines a timing at which the update program is executed so as to allow an updating process to be completed during standby in the schedule when the importance is equal to or less than a predetermined level, and
determines a timing at which the update program is executed so as to execute at least a portion of an updating process during any of charging, discharging, and standby in the schedule when the importance is higher than the predetermined level.

20. The storage battery system according to any of 4 to 19, further including:
a charge information acquisition unit that acquires charge information indicating a remaining amount of charge of the storage battery,
wherein the updating timing determination unit determines to execute the update program when the remaining amount of charge of the storage battery specified by the charge information is equal to or higher than a predetermined level.

21. The storage battery system according to any of 4 to 20, further including:
an input reception unit that receives a user's input of permission time information indicating a time when execution of the update program is permitted,
wherein the updating timing determination unit determines to execute the update program at a time when execution of the update program is permitted, which is specified by the permission time information.

22. The storage battery system according to any of 4 to 20, further including:
an input reception unit that receives a user's input of non-permission time information indicating a time when execution of the update program is not permitted,
wherein the updating timing determination unit determines to execute the update program at a time except for the time when execution of the update program is not permitted, which is specified by the non-permission time information.

23. A method of updating a storage battery system including a storage battery that performs power charging and discharging, the method including:
causing a computer to determine whether the storage battery is in a discharging state and to determine a timing at which an update program for updating a control program for controlling the storage battery apparatus is executed, on the basis of the determination.

23-2. The method according to 23,
wherein it is determined which state of charging, discharging or standby the storage battery is in.

23-3. The method according to 23 or 23-2,
wherein the determination is performed on the basis of a current state of the storage battery.

23-4. The method according to any one of 23 to 23-3,
wherein the computer executes an updating information acquisition process of acquiring updating information including the update program, a charging and discharging information acquisition process of acquiring charging and discharging information for determining which mode of charging, discharging, and standby a state of the storage battery is, and an updating timing determination process of determining a timing at which the update program is executed, using the charging and discharging information.

23-5. The method according to 23-4,
wherein in the updating timing determination process, the update program is determined to be executed when the state of the storage battery is a standby mode.

23-6. The method according to 23-4,
wherein in the charging and discharging information acquisition process, a charging and discharging schedule of the storage battery is acquired as the charging and discharging information.

23-7. The method according to 23-6,
wherein in the updating timing determination process, the update program is determined to be executed during standby in the schedule.

23-8. The method according to 23-6 or 23-7,
wherein in the charging and discharging information acquisition process, a charging and discharging prediction schedule determined on the basis of a past history of charging and discharging of the storage battery is acquired as the charging and discharging schedule.

23-9. The method according to any one of 23-4 to 23-8,
wherein in the updating information acquisition process, the updating information including updating time information roughly indicating an estimated period of time from execution of the update program to completion of an updating process is acquired, and wherein in the updating timing determination process, a timing at which the update program is executed is determined in consideration of the period of time which is specified by the updating time information.

23-10. The method according to 23-9 dependent upon any one of 23-6 to 23-8, wherein in the updating timing determination process, a timing at which the update program is executed is determined so as to allow the updating process to be completed during standby in the schedule on the basis of the charging and discharging schedule and the updating time information.

23-11. The method according to any one of 23-4 to 23-10,
wherein in the updating information acquisition process, the updating information including deadline information indicating a deadline for completing the updating process is acquired, and wherein in the updating timing determination process, a timing at which the update program is executed is determined in consideration of the deadline which is specified by the deadline information.

23-12. The method according to 23-11,
wherein in the updating timing determination process, the update program is determined to be executed when the state of the storage battery is a standby mode in a case where a remaining time before the deadline is equal to or longer than a predetermined value, and the update program is determined to be executed when the state of the storage battery is any of a charging mode, a discharging mode and a standby mode in a case where the remaining time before the deadline is less than the predetermined value.

23-13. The method according to 23-11 dependent upon 23-6, wherein in the updating timing determination process, the update program is determined to be executed during standby in the schedule when a remaining time before the deadline is equal to or longer than a predetermined value, and the update program is determined to be executed during any of charging, discharging, and standby in the schedule when the remaining time before the deadline is less than the predetermined value.

23-14. The method according to 23-11 dependent upon 23-10, wherein in the updating timing determination process, a timing at which the update program is executed is determined so as to allow an updating process to be completed during standby in the schedule when a remaining time before the deadline is equal to or longer than a predetermined value, and a timing at which the update program is executed is determined so as to execute at least a portion of an updating process during any of charging, discharging, and standby in the schedule when the remaining time before the deadline is less than the predetermined value.

23-15. The method according to 23-11,
wherein in the updating information acquisition process, the updating information including a plurality of the update programs for updating the control programs for controlling a plurality of respective modules included in the storage battery system is acquired, and wherein in the updating timing determination process, a timing at which the update program is executed is determined so as to execute the plurality of update programs at the same timing when a remaining time before the deadline is equal to or longer than a predetermined value, and a timing at which the update program is executed is determined so as to execute the plurality of update programs at different timings or at the same timing when the remaining time before the deadline is less than the predetermined value.

23-16. The method according to any one of 23-4 to 23-15,
wherein in the updating information acquisition process, the updating information including importance information indicating importance of an updating process is acquired, and wherein in the updating timing determination process, a timing at which the update program is executed is determined in consideration of importance which is specified by the importance information.

23-17. The method according to 23-16,
wherein in the updating timing determination process, the update program is determined to be executed when the state of the storage battery is a standby mode in a case where the importance is equal to or less than a predetermined level, and the update program is determined to be executed when the state of the storage battery is any of a charging mode, a discharging mode, and a standby mode in a case where the importance is higher than the predetermined level.

23-18. The method according to 23-16 dependent upon 23-6, wherein in the updating timing determination process, the update program is determined to be executed during standby in the schedule when the importance is equal to or less than a predetermined level, and the update program is determined to be executed during any of charging, discharging, and standby in the schedule when the importance is higher than the predetermined level.

23-19. The method according to 23-16 dependent upon 23-10, wherein in the updating timing determination process, a timing at which the update program is executed is determined so as to allow an updating process to be completed during standby in the schedule when the importance is equal to or less than a predetermined level, and a timing at which the update program is executed is determined so as to execute at least a portion of an updating process during any of charging, discharging, and standby in the schedule when the importance is higher than the predetermined level.

23-20. The method according to any one of 23-4 to 23-19, causing the computer to further execute:

a charge information acquisition process of acquiring charge information indicating a remaining amount of charge of the storage battery, wherein in the updating timing determination process, the update program is determined to be executed when the remaining amount of charge of the storage battery specified by the charge information is equal to or higher than a predetermined level.

23-21. The method according to any one of 23-4 to 23-20, causing the computer to further execute:

an input reception process of receiving a user's input of permission time information indicating a time when execution of the update program is permitted, wherein in the updating timing determination process, the update program is determined to be executed at a time when execution of the update program is permitted, which is specified by the permission time information.

23-22. The method according to any one of 23-4 to 23-20, causing the computer to further execute:

an input reception process of receiving a user's input of non-permission time information indicating a time when execution of the update program is not permitted, wherein in the updating timing determination process, the update program is determined to be executed at a time except for the time when execution of the update program is not permitted, which is specified by the non-permission time information.

24. A program for a storage battery system including a storage battery that performs power charging and discharging, the program causing a computer to function as:

a unit that determines whether the storage battery is in a discharging state and determines a timing at which an update program for updating a control program for controlling the storage battery apparatus is executed, on the basis of the determination.

24-2. The program according to 24, causing the computer to further function as:

a unit that determines which state of charging, discharging or standby the storage battery is in.

24-3. The program according to 24 or 24-2, causing the computer to further function as:

a unit that performs the determination on the basis of a current state of the storage battery.

24-4. The program according to any one of 24 to 24-3, causing the computer to function as:

an updating information acquisition unit that acquires updating information including the update program;

a charging and discharging information acquisition unit that acquires charging and discharging information for determining which mode of charging, discharging, and standby a state of the storage battery is; and an updating timing determination unit that determines a timing at which the update program is executed, using the charging and discharging information.

24-5. The program according to 24-4, causing the updating timing determination unit to determine to execute the update program when the state of the storage battery is a standby mode.

24-6. The program according to 24-4, causing the charging and discharging information acquisition unit to acquire a charging and discharging schedule of the storage battery as the charging and discharging information.

24-7. The program according to 24-6, causing the updating timing determination unit to determine to execute the update program during standby in the schedule.

24-8. The program according to 24-6 or 24-7, causing the charging and discharging information acquisition unit to acquire a charging and discharging prediction schedule determined on the basis of a past history of charging and discharging of the storage battery, as the charging and discharging schedule.

24-9. The program according to any one of 24-4 to 24-8, causing the updating information acquisition unit to acquire updating time information roughly indicating an estimated period of time from execution of the update program to completion of an updating process, and causing the updating timing determination unit to determine a timing at which the update program is executed, in consideration of the period of time which is specified by the updating time information.

24-10. The program according to 24-9 dependent upon any one of 24-6 to 24-8, causing the updating timing determination unit to determine a timing at which the update program is executed so as to allow the updating process to be completed during standby in the schedule, on the basis of the charging and discharging schedule and the updating time information.

24-11. The program according to any one of 24-4 to 24-10, causing the updating information acquisition unit to acquire the updating information including deadline information indicating a deadline for completing the updating process, and causing the updating timing determination unit to determine a timing at which the update program is executed, in consideration of the deadline which is specified by the deadline information.

24-12. The program according to 24-11, causing the updating timing determination unit to determine to execute the update program when the state of the storage battery is a standby mode in a case where a remaining time before the deadline is equal to or longer than a predetermined value, and to determine to execute the update program when the state of the storage battery is any of a charging mode, a discharging mode and a standby mode in a case where the remaining time before the deadline is less than the predetermined value.

24-13. The program according to 24-11 dependent upon 24-6, causing the updating timing determination unit to determine to execute the update program during standby in the schedule when a remaining time before the deadline is equal to or longer than a predetermined value, and to determine to execute the update program during any of charging, discharging, and standby in the schedule when the remaining time before the deadline is less than the predetermined value.

24-14. The program according to 24-11 dependent upon 24-10, causing the updating timing determination unit to determine a timing at which the update program is executed so as to allow an updating process to be completed during standby in the schedule when a remaining time before the deadline is equal to or longer than a predetermined value, and to determine a timing at which the update program is executed so as to execute at least a portion of an updating process during any of charging, discharging, and standby in the schedule when the remaining time before the deadline is less than the predetermined value.

24-15. The program according to 24-11, causing the updating information acquisition unit to acquire the updating information including a plurality of the update programs for updating the control programs for controlling a plurality of respective modules included in the storage battery system, and causing the updating timing determination unit to determine a timing at which the update program is executed so as to execute the plurality of update programs at the same timing when a remaining time before the deadline is equal to or longer than a predetermined value, and to determine a timing at which the update program is executed so as to execute the plurality of update programs at different timings or at the same timing when the remaining time before the deadline is less than the predetermined value.

24-16. The program according to any one of 24-4 to 24-15, causing the updating information acquisition unit to acquire the updating information including importance information indicating importance of an updating process, and causing the updating timing determination unit to determine a timing at which the update program is executed, in consideration of importance which is specified by the importance information.

24-17. The program according to 24-16, causing the updating timing determination unit to determine to execute the update program when the state of the storage battery is a standby mode in a case where the importance is equal to or less than a predetermined level, and to determine to execute the update program when the state of the storage battery is any of a charging mode, a discharging mode, and a standby mode in a case where the importance is higher than the predetermined level.

24-18. The program according to 24-16 dependent upon 24-6, causing the updating timing determination unit to determine to execute the update program during standby in the schedule when the importance is equal to or less than a predetermined level, and to determine to execute the update program during any of charging, discharging, and standby in the schedule when the importance is higher than the predetermined level.

24-19. The program according to 24-16 dependent upon 24-10, causing the updating timing determination unit to determine a timing at which the update program is executed so as to allow an updating process to be completed during standby in the schedule when the importance is equal to or less than a predetermined level, and to determine a timing at which the update program is executed so as to execute at least a portion of an updating process during any of charging, discharging, and standby in the schedule when the importance is higher than the predetermined level.

24-20. The program according to any one of 24-4 to 24-19, causing the computer to further function as:

a charge information acquisition unit that acquires charge information indicating a remaining amount of charge of the storage battery, and wherein the program causes the updating timing determination unit to determine to execute the update program when the remaining amount of charge of the storage battery specified by the charge information is equal to or higher than a predetermined level.

24-21. The program according to any one of 24-4 to 24-20, causing the computer to further function as:

an input reception unit that receives a user's input of permission time information indicating a time when execution of the update program is permitted, wherein the program causes the updating timing determination unit to determine to execute the update program at a time when execution of the update program is permitted, which is specified by the permission time information.

24-22. The program according to any one of 24-4 to 24-20, causing the computer to further function as:

an input reception unit that receives a user's input of non-permission time information indicating a time when execution of the update program is not permitted, wherein the program causes the updating timing determination unit to determine to execute the update program at a time except for the time when execution of the update program is not permitted, which is specified by the non-permission time information.

The application is based on Japanese Patent Application No. 2013-186509 filed on Sep. 9, 2013, the content of which is incorporated herein by reference.

The invention claimed is:

1. A storage battery system comprising:
a storage battery that performs power charging and discharging;
a memory storing instructions; and
a processor configured to execute the instructions to:
acquire updating information including: 1) an update program for updating a control program for controlling the storage battery system, and 2) deadline information indicating a deadline for completing the updating process;
acquire charging and discharging information for determining which mode of charging, discharging, and standby a state of the storage battery is;
determine whether the storage battery is in a discharging state;
determine a timing at which the update program is executed on the basis of the determination, the charging and discharging information, and the deadline which is specified by the deadline information;
determine to execute the update program when the state of the storage battery is a standby mode in a case where a remaining time before the deadline is equal to or longer than a predetermined value; and
determine to execute the update program when the state of the storage battery is any of a charging mode, a discharging mode and a standby mode in a case where the remaining time before the deadline is less than the predetermined value.

2. A method of updating a storage battery system including a storage battery that performs power charging and discharging, the method comprising:
  causing a computer to:
    acquire updating information including an update program for updating a control program for controlling the storage battery system, the updating information including importance information indicating importance of an updating process;
    acquire charging and discharging information for determining which mode of charging, discharging, and standby a state of the storage battery is;
    determine whether the storage battery is in a discharging state; and
    determine a timing at which the update program is executed, on the basis of the determination, the charging and discharging information, and importance which is specified by the importance information.

3. A non-transitory storage medium storing a program for a storage battery system including a storage battery that performs power charging and discharging, the program causing a computer to:
  acquire updating information including an update program for updating a control program for controlling the storage battery system, the updating information including importance information indicating importance of an updating process;
  acquire charging and discharging information for determining which mode of charging, discharging, and standby a state of the storage battery is;
  determine whether the storage battery is in a discharging state; and
  determine a timing at which the update program is executed, on the basis of the determination, the charging and discharging information, and importance which is specified by the importance information.

4. A storage battery system comprising:
  a storage battery that performs power charging and discharging;
  a memory storing instructions; and
  a processor configured to execute the instructions to:
    acquire updating information including: 1) an update program for updating a control program for controlling the storage battery system, and 2) deadline information indicating a deadline for completing the updating process;
    acquire charging and discharging information for determining which mode of charging, discharging, and standby a state of the storage battery is, the charging and discharging information including a charging and discharging schedule of the storage battery;
    determine whether the storage battery is in a discharging state;
    determine a timing at which the update program is executed on the basis of the determination, the charging and discharging information, and the deadline which is specified by the deadline information;
    determine to execute the update program during standby in the schedule when a remaining time before the deadline is equal to or longer than a predetermined value; and
    determine to execute the update program during any of charging, discharging, and standby in the schedule when the remaining time before the deadline is less than the predetermined value.

5. A storage battery system comprising:
  a storage battery that performs power charging and discharging;
  a memory storing instructions; and
  a processor configured to execute the instructions to:
    acquire updating information including: 1) an update program for updating a control program for controlling the storage battery system, and 2) deadline information indicating a deadline for completing the updating process;
    acquire charging and discharging information for determining which mode of charging, discharging, and standby a state of the storage battery is;
    determine whether the storage battery is in a discharging state;
    determine a timing at which the update program is executed on the basis of the determination, the charging and discharging information, and the deadline which is specified by the deadline information;
    determine a timing at which the update program is executed so as to allow an updating process to be completed during standby in the schedule when a remaining time before the deadline is equal to or longer than a predetermined value; and
    determine a timing at which the update program is executed so as to execute at least a portion of an updating process during any of charging, discharging, and standby in the schedule when the remaining time before the deadline is less than the predetermined value.

6. A storage battery system comprising:
  a storage battery that performs power charging and discharging;
  a memory storing instructions; and
  a processor configured to execute the instructions to:
    acquire updating information including: 1) an update program for updating a control program for controlling the storage battery system, and 2) deadline information indicating a deadline for completing the updating process;
    acquire charging and discharging information for determining which mode of charging, discharging, and standby a state of the storage battery is;
    determine whether the storage battery is in a discharging state; and
    determine a timing at which the update program is executed on the basis of the determination, the charging and discharging information, and the deadline which is specified by the deadline information;
  wherein the updating information further includes a plurality of the update programs for updating the control programs for controlling a plurality of respective modules included in the storage battery system, and the processor is further configured to execute the instructions to:
    determine a timing at which the update program is executed so as to execute the plurality of update programs at the same timing when a remaining time before the deadline is equal to or longer than a predetermined value; and
    determine a timing at which the update program is executed so as to execute the plurality of update programs at different timings or at the same timing when the remaining time before the deadline is less than the predetermined value.

7. A storage battery system comprising:
  a storage battery that performs power charging and discharging;
  a memory storing instructions; and a processor configured to execute the instructions to:
acquire updating information including an update program for updating a control program for controlling the storage battery system, the updating information including importance information indicating importance of an updating process;
acquire charging and discharging information for determining which mode of charging, discharging, and standby a state of the storage battery is;
determine whether the storage battery is in a discharging state; and
determine a timing at which the update program is executed, on the basis of the determination, the charging and discharging information, and importance which is specified by the importance information.

8. The storage battery system according to claim 7, wherein it is determined which state of charging, discharging or standby the storage battery is in.

9. The storage battery system according to claim 7, wherein the determination is performed on the basis of a current state of the storage battery.

10. The storage battery system according to claim 7, wherein the updating timing determination unit determines to execute the update program when the state of the storage battery is a standby mode.

11. The storage battery system according to claim 7, wherein the charging and discharging information acquisition unit acquires a charging and discharging schedule of the storage battery, as the charging and discharging information.

12. The storage battery system according to claim 11, wherein the updating timing determination unit determines to execute the update program during standby in the schedule.

13. The storage battery system according to claim 11, wherein the charging and discharging information acquisition unit acquires a charging and discharging prediction schedule which is determined on the basis of a past history of charging and discharging of the storage battery, as the charging and discharging schedule.

14. The storage battery system according to claim 7, wherein the updating information acquisition unit acquires the updating information including updating time information roughly indicating an estimated period of time from execution of the update program to completion of an updating process, and
wherein the updating timing determination unit determines a timing at which the update program is executed, in consideration of the period of time which is specified by the updating time information.

15. The storage battery system according to claim 14, wherein the charging and discharging information acquisition unit acquires a charging and discharging schedule of the storage battery, as the charging and discharging information,
wherein the updating timing determination unit determines a timing at which the update program is executed so as to allow the updating process to be completed during standby in the schedule, on the basis of the charging and discharging schedule and the updating time information.

16. The storage battery system according to claim 7, wherein the updating timing determination unit
determines to execute the update program when the state of the storage battery is a standby mode in a case where the importance is equal to or less than a predetermined level, and
determines to execute the update program when the state of the storage battery is any of a charging mode, a discharging mode, and a standby mode in a case where the importance is higher than the predetermined level.

17. The storage battery system according to claim 7, wherein the charging and discharging information acquisition unit acquires a charging and discharging schedule of the storage battery, as the charging and discharging information,
wherein the updating timing determination unit
determines to execute the update program during standby in the schedule when the importance is equal to or less than a predetermined level, and
determines to execute the update program during any of charging, discharging, and standby in the schedule when the importance is higher than the predetermined level.

18. The storage battery system according to claim 7, wherein the updating timing determination unit
determines a timing at which the update program is executed so as to allow an updating process to be completed during standby in the schedule when the importance is equal to or less than a predetermined level, and
determines a timing at which the update program is executed so as to execute at least a portion of an updating process during any of charging, discharging, and standby in the schedule when the importance is higher than the predetermined level.

19. The storage battery system according to claim 7, further comprising:
a charge information acquisition unit that acquires charge information indicating a remaining amount of charge of the storage battery,
wherein the updating timing determination unit determines to execute the update program when the remaining amount of charge of the storage battery specified by the charge information is equal to or higher than a predetermined level.

20. The storage battery system according to claim 7, further comprising:
an input reception unit that receives a user's input of permission time information indicating a time when execution of the update program is permitted,
wherein the updating timing determination unit determines to execute the update program at a time when execution of the update program is permitted, which is specified by the permission time information.

21. The storage battery system according to claim 7, further comprising:
an input reception unit that receives a user's input of non-permission time information indicating a time when execution of the update program is not permitted,
wherein the updating timing determination unit determines to execute the update program at a time except for the time when execution of the update program is not permitted, which is specified by the non-permission time information.

* * * * *